(12) United States Patent
Reitman

(10) Patent No.: US 12,113,906 B1
(45) Date of Patent: *Oct. 8, 2024

(54) END-TO-END ENCRYPTION BASED ON A SIMPLE SHARED SECRET

(71) Applicant: Boris Reitman, Burnaby (CA)

(72) Inventor: Boris Reitman, Burnaby (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/993,931

(22) Filed: Nov. 24, 2022

Related U.S. Application Data

(62) Division of application No. 17/083,314, filed on Oct. 29, 2020.

(60) Provisional application No. 62/927,568, filed on Oct. 29, 2019.

(51) Int. Cl.
*H04L 29/06* (2006.01)
*G06F 21/00* (2013.01)
*H04L 9/08* (2006.01)
*H04L 9/32* (2006.01)
*H04L 67/55* (2022.01)

(52) U.S. Cl.
CPC .......... *H04L 9/3226* (2013.01); *H04L 9/0838* (2013.01); *H04L 9/085* (2013.01); *H04L 9/3221* (2013.01); *H04L 67/55* (2022.05)

(58) Field of Classification Search
None
See application file for complete search history.

(56) References Cited

U.S. PATENT DOCUMENTS

| | | | |
|---|---|---|---|
| 2012/0082312 A1* | 4/2012 | Liu | H04L 9/0863 380/262 |
| 2015/0186657 A1* | 7/2015 | Nakhjiri | H04L 9/0825 713/193 |
| 2017/0339118 A1* | 11/2017 | Hwang | H04L 9/0844 |
| 2019/0349191 A1* | 11/2019 | Soriente | H04L 9/0844 |

OTHER PUBLICATIONS

Brian Warner, "Move Things From One Computer to Another, Safely," PyCon2016.

* cited by examiner

*Primary Examiner* — Lisa C Lewis

(57) ABSTRACT

This invention enables asynchronous encrypted communication under a protection of a simple password which must be communicated out-of-band. The password is easily communicable in-person, by telephone or by a text message. The invention assumes that one of the parties has an online device, such as a smartphone. After the encrypted session has been established, it can be used for a variety of cryptographic applications, such as encrypting or decrypting messages, sharing of cryptographic keys, and verifying data. The invention also has the secondary benefit of authenticating both parties to each other.

38 Claims, 15 Drawing Sheets

END-TO-END ENCRYPTION BASED ON A SIMPLE SHARED SECRET

FIELD OF THE INVENTION

The present invention relates to a method of electronically sending a secret from one person to another.

This invention builds upon a Password Authenticated Key Exchange (PAKE) protocol to enable a person to use his online device to exchange data with a second person who knows a simple password. The participants verify each other's identity and transfer data encrypted end to end.

The invention has many applications: to identify a person, to verify a public key, to transfer a cryptographic key or password, to enable further end-to-end encrypted communication, to send encrypted emails, to share data via online storage, to send cryptocurrency addresses and bank account numbers, to verify validity of data.

OBJECTS OF THE INVENTION

This invention allows to transfer secret data from one person to another, provided that one person has an online device and that both parties can communicate in advance to agree on a simple password. The online device may be a mobile device such as a tablet or a smartphone, a set-top appliance, an Internet-of-Things (IoT) device, or a personal computer.

The invention allows communicating parties to verify the identity of each other.

The owner of the device may be away from the device when the data exchange process is triggered, and also during the process of the entire exchange.

This invention poses no limitation on the nature of the simple password, but recommends to use either a four digit code or a memorable word that is hard to guess in several attempts.

This invention specifies how to effectively limit the number of guessing attempts of the password in order to prevent brute force attacks on the password.

This invention specifies how to enforce a one-time feature of the password, so that after the successful transfer of the secret data, the transfer can not be repeated with the same password.

This invention allows to use a One Time Password (OTP) sequence generator in order to use a different simple password in a series of exchanges.

SUMMARY OF THE INVENTION

This invention allows two participants Alice and Bob to securely exchange electronic data provided that they know a simple password. The password may be a common word or a four digit code that is hard to guess in several attempts. In the preferred embodiment, the password expires after the exchange.

The invention utilizes an online device such as a smartphone as one of the ends in an end-to-end encrypted communication. The only requirement for the online device is to be either reachable on the network directly or to be able to be triggered by a Push Notification, after which it can wake and establish a connection with the requesting device. The security model assumes that only the owner of the device has access to it. A signaling server assists in connecting the two ends.

The device is triggered either by a connection or by a Push Notification. It then runs a computation and transmits the result to the initiator of the protocol. The preferred embodiment uses either an Android or an iOS application running on a smartphone. In the Android operating system, the application is activated by the operating system to process Push Notifications. In the iOS operation system, a Notification Service Extension processes Push Notifications and updates the database of the associated application.

Assume that Alice is the owner of a device and that Bob has agreed on a password with her. Alice registers her device with a signaling server and configures the device to accept a connection on behalf of Bob. She keeps the device online. By relaying data via the signaling server, Bob's software communicates with her device according to the invented protocol. This protocol does not require manual operation of the device. The device defends from brute force attacks by rejecting connection requests after several authentication failures.

The protocol leads the participants to demonstrate a cryptographic proof that they know the password, and also causes them to establish an encrypted communication channel. Using the encrypted channel, each side sends data to the other side. The data may also include a new password or a One Time Password (OTP) sequence generation parameters for future communication.

The data exchanged can be human readable texts, or they may include cryptographic keys. Because the exchange authenticates the parties to each other, the invention complements existing methods of electronic data exchanges and of authenticity verification. For example, if Alice sends her public key to Bob using the invented method, he can verify her digital signatures. If a symmetric key is exchanged using the invented method, this key can be used to decrypt data which were, or which will be, communicated between Alice and Bob by other means. Using such techniques, the invention can be applied to sending encrypted emails and private notes, to securely sharing large volumes of data, and to authenticating parties in Instant Messaging communication.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
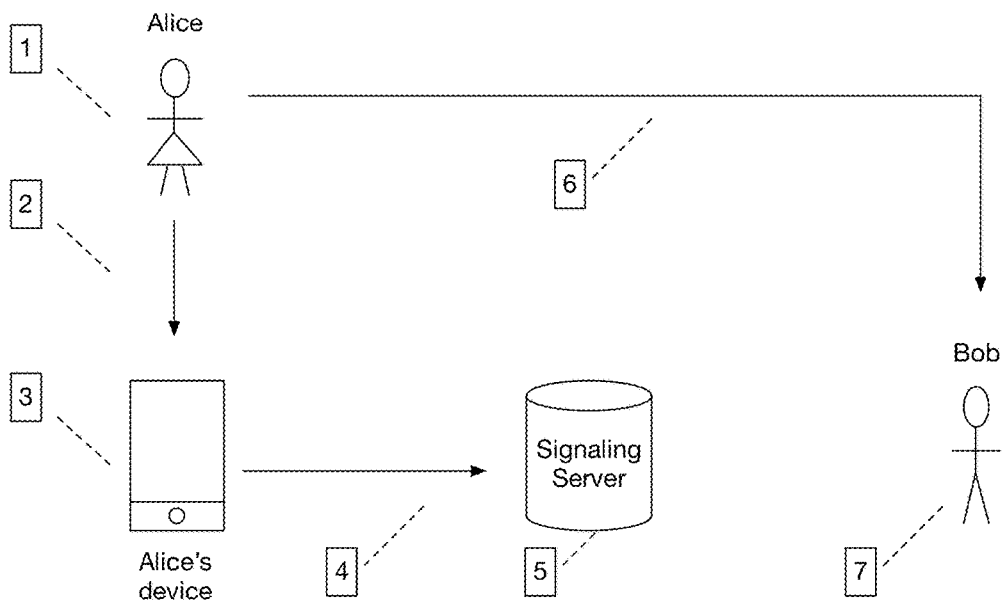
FIG. 1 demonstrates that Alice registers her device with signaling server, and communicates to Bob a simple secret password.

FIG. 1 shows a preparation process that is performed by Alice [1]. In step [2] she prepares her online device [3] to hold data for Bob [7]. In step [4] the device registers itself with a signaling server [5]. Then, Alice contacts Bob to give him the password [6].

The responder named Alice and the initiator named Bob agree in advance on a lookup identifier L. This value is not a secret and is available in plaintext to Alice, to Bob and to the signaling server. It has a dual purpose to allow the signaling server to identify Alice's device, and also to allow Alice's device to identify Bob. For example, it can be the string "alice-mailbox-17" which Alice uses to communicate only with Bob. Alternatively, L can be a random number.

Alice and Bob may communicate L to each other by any means. For example, Alice can send to Bob the value L by email, or it can be included in the plaintext header of her encrypted message to Bob. If the invention is applied to provide encrypted email functionality, then L can be either the value of the "Message-ID" SMTP header, or a concatenation of the sender and recipient addresses transformed by a cryptographic hash function.

For an increased confidentiality of the plaintext metadata, L should contain hash codes of data, not the original values of email addresses, real names, account IDs, etc.

The identifier L can be treated as a tuple, or as a string encoding of the tuple. For example, L can be formatted as a URL which incorporates all components of the tuple. It can also contain the network address of the signaling server.

In step [4] Alice registers the record (L, I) with the signaling server, where I is her device's identifier in the Push Notification network. For example, for iOS devices I is Apple Device ID and the Push Notification network is Apple Push Notification Service (APNS). In order to defend from active attacks, Alice can register the device with the signaling server significantly earlier than notifying Bob that he has received an encrypted message.

Figure 2:
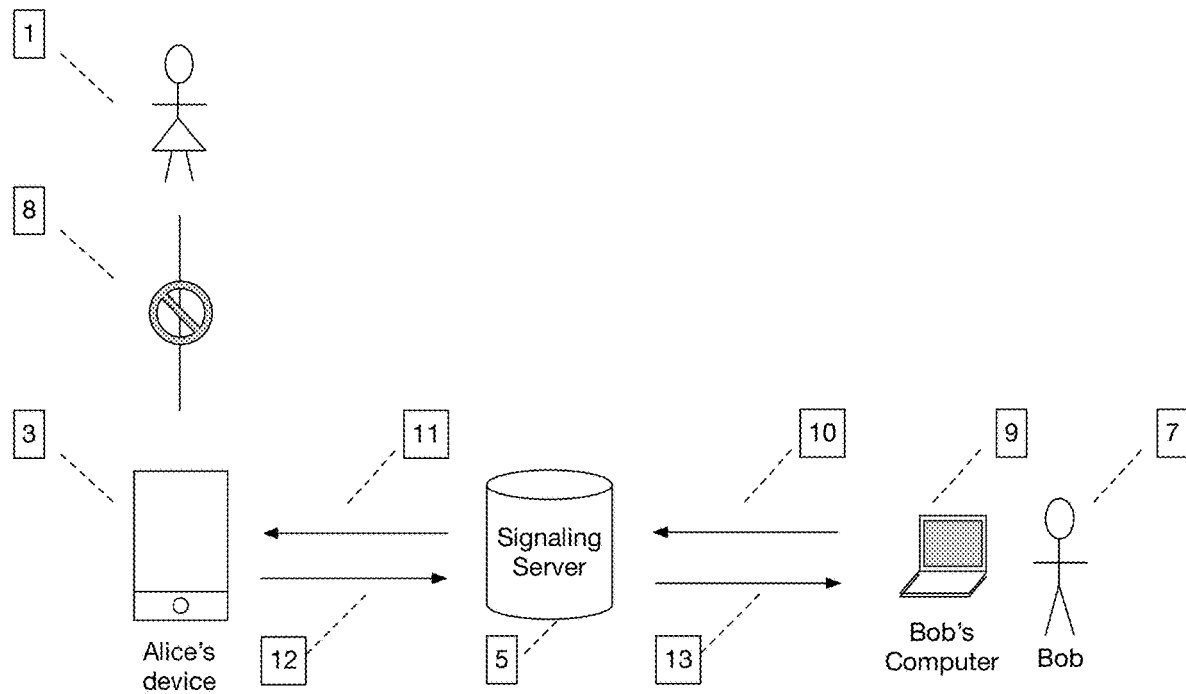
FIG. 2 demonstrates that Bob uses the provided secret password to communicate with Alice's device via the signaling server that triggers Alice's device to respond.

FIG. 2 shows how Bob uses the password to exchange data with Alice's device. As long as the device remains online, Alice may be away from the device [8]. Bob uses a computer [9] to communicate with the device via the signaling server. The diagram shows the first round of communication. In step [10] Bob sends a request to the signaling server which contacts the device via a Push Notification [11]. The device receives the notification, processes it, and sends a response [12] to the signaling server. The signaling server relays the data to Bob [13].

The security model assumes that both Bob and Alice utilize legitimate software and hardware that does not send any private information to a third party. The security model does not assume that the software running on the signaling server is legitimate. The exchange protocol guarantees that the signaling server could at most fail to transmit secret messages, but would not be able to decrypt them.

The invention does not limit to the specifics of the online device, but requires that the device can be connected to the Internet directly, or can respond to Push Notifications without manual operation by Alice, and that such notifications would activate the necessary program on the device. At present, the invention can be embodied using a mobile device running either iOS or Android operating system. On iOS, this feature is supported by Notification Service extensions and by applications running in the background. On Android, silent Push Notifications activate terminated applications.

Devices such as set-top boxes, Internet-of-Things (IoT) devices, and computer workstations on a Local Area Network (LAN) connected to the Internet, can be triggered directly via UDP/IP or TCP/IP protocols, provided that their LAN router is correctly configured to forward packets to them. Alternatively, they can utilize STUN servers to receive connections when they don't have a public IP. In this case no signaling server is needed, and Alice and Bob can communicate in a Peer-to-Peer fashion. Also L would contain the network address of Alice's online device.

The various types of online devices differ in the attack surface that an attacker can exploit to expose the identity of Alice based on the network address of the device. The preferred embodiment uses smartphones because they are a ubiquitous personal accessory, they have a high degree of confidentiality of data stored on them, they are rarely separated from their owners, and with few exceptions such as air travel, they are always online via either cellular networks or WiFi. They also have intuitive user interfaces. Using the invention in this embodiment is practical for laymen.

Provided that Bob used the correct password, the protocol enables him to establish a symmetrically encrypted channel with Alice. This requires only one round of communication. In this round, a Push Notification is sent to Alice's device and her device sends a response back to Bob. Her device responds automatically, without any manual action from her, unless there is cause to display a security warning to her and to await her explicit approval to continue. In this response, Alice's device can include encrypted data.

In order for Alice's device to mark the secret as successfully transferred, Bob must demonstrate that he derived the same symmetric key as she used to encrypt the secret data. This also would prove to Alice that Bob knew the correct password. To accomplish this, a second round of communication is required. In this round, Bob sends to Alice's device a Message Authentication Code (MAC) computed with the derived key. The device verifies the MAC, releases secret data M into the established secure channel, and marks the transfer as complete.

During the first communication round, Alice's device also includes a MAC to demonstrate that it also has the same symmetric key as Bob would derive from the received parameters. Before Bob replies with confidential data encrypted with that key, he verifies the received MAC. If the MAC is correct, this proves to Bob that Alice knows the same password as he, and that he is not communicating with an impostor of Alice. (A weaker form of mutual authentication is possible in another embodiment, if each party sends a hash-code of the derived symmetric key to the other side instead of the MAC.)

The invention utilizes a Password Authenticated Key Exchange (PAKE) protocol. The demonstrated preferred embodiment is based on the protocol DH-OPRF. This cryptographic protocol is described in detail in the draft Request For Comment (RFC) document for OPAQUE protocol "draft-krawczyk-cfrg-opaque-06".

The invention may be also embodied using the Secure Remote Password (SRP) protocol, another Oblivious Pseudo Random Function (OPRF) protocol, or any other PAKE protocol, or any other Zero-Knowledge proof of knowledge scheme that enables to establish a shared secret key, provided that the mathematical quan-tities in the preferred embodiment of the protocol are modified according to the alternate protocol.

The mathematical values used in the preferred DH-OPRF protocol are, $$\alpha = H'(x)g^r, \beta = \alpha^k, v = g^k$$

In this scheme g is a generator of a cyclic group G of prime order q, and H' is a hash function that maps arbitrary passwords to the elements of that group. The structure of the group and its generator g are publicly known. The exponents k and r are positive uniformly distributed random integers greater than 1 and less than q. If the exponential blinding variant is used, then a is defined differently, as $\alpha = (H'(x))^r$. An embodiment of the invention may use either variant.

Images of the hash function H' should be uniformly distributed. If G is an Elliptic Curve group, then H' is a hash-to-curve function, and its preferred embodiment is specified in draft RFC "draft-irtf-cfrg-hash-to-curve-09." In particular, if G is X25519 group, then H' is the Elligator hash-to-curve function.

The protocol enables Alice and Bob to derive the same symmetric cryptographic key K which is used to encrypt communication between Alice and Bob. Alice derives it according to the formula, $$K = F_A(k;x) = H(x,v,H'(x)^k)$$

The function H is either a hash function or, for a hardened version, a compo-sition of a hash function and a Key Derivation Function (KDF) using a constant 0 as the salt parameter. The hash function can be SHA-256 or another cryptographically secure hashing algorithm. The KDF function can be PBKDF2, Argon 2, Scrypt, or another KDF algorithm.

Bob derives the same symmetric key using a different computation, $$K = F_B(k;x) = H(x,v,\beta v^{-r})$$

The group element $v^{-r}$ denotes the inverse of $v^r$ in G. If the exponential blinding variant was used to compute a, then the computation is $F_B(k; x) = \mathbb{Z}H(x, v, \beta^{1/r})$, where 1/r is the inverse of r in group $\mathbb{Z}_q^*$.

During preparation [2] Alice's device creates an accounting record for Bob in the device's onboard database. The record is a mapping L:R where R is a tuple (t, T, k, X, M, P, U). The value t is a timestamp which represents the date and time of a previous authentication attempt. It is used to defend from brute force attacks. The value T is a time interval after which the device will reject all requests from Bob with lookup identifier L. If T is null, then the device does not impose such limits, and Bob may initiate the protocol with Alice at any time. In the preferred embodiment, T should not be larger than the time it would take for an adversary Eve to learn the password which Alice shared with Bob. For example, if Alice gave the password to Bob by email, and Alice is confident that his mailbox would not be compromised in one week, then Alice can set T to a period of one week.

The k value in the record R is the DH-OPRF salt value. The M value is a secret that Alice wishes to transmit to Bob, stored in plaintext. The U sub-record represents information about Bob. It may contain any past secret messages from him, his full name, his email address, and any other information that Alice knows about Bob. The P value lists Bob's permissions that Alice grants him.

The X sub-record is a set of passwords or encryption keys, where the keys are derived from the passwords. In the preferred embodiment Alice and Bob both know the actual password that they agree on. However, during the first instance of communication with Alice using the invented scheme, Bob may set a new password. This new password may be one that he does not want Alice to know. In this case, he would use the established secure communication channel to send to her device an encryption key generated from the new password. Upon receipt, the device will store the received key in X.

Also, the X sub-record may store a password sequence $\{x_2\}$. In this case, denote by x the current password in the sequence. The X sub-record may also include a permanent password $x_p$, in addition to a password sequence. Such configuration would be used for 2nd Factor Authentication ($2F_A$). In this case, denote by x the pair ($x_p$, $x_1$) where $x_p$ is a permanent password, and $x_1$ is the current password in the sequence. If a password sequence is generated according to an algorithm (e.g. TOTP), then X includes the input parameters to the generating algorithm instead of the actual sequence.

The invention uses any existing cryptographically secure symmetric encryption scheme, such as AES-256, and both Alice and Bob must agree in advance on which encryption method to use.

Figure 3:
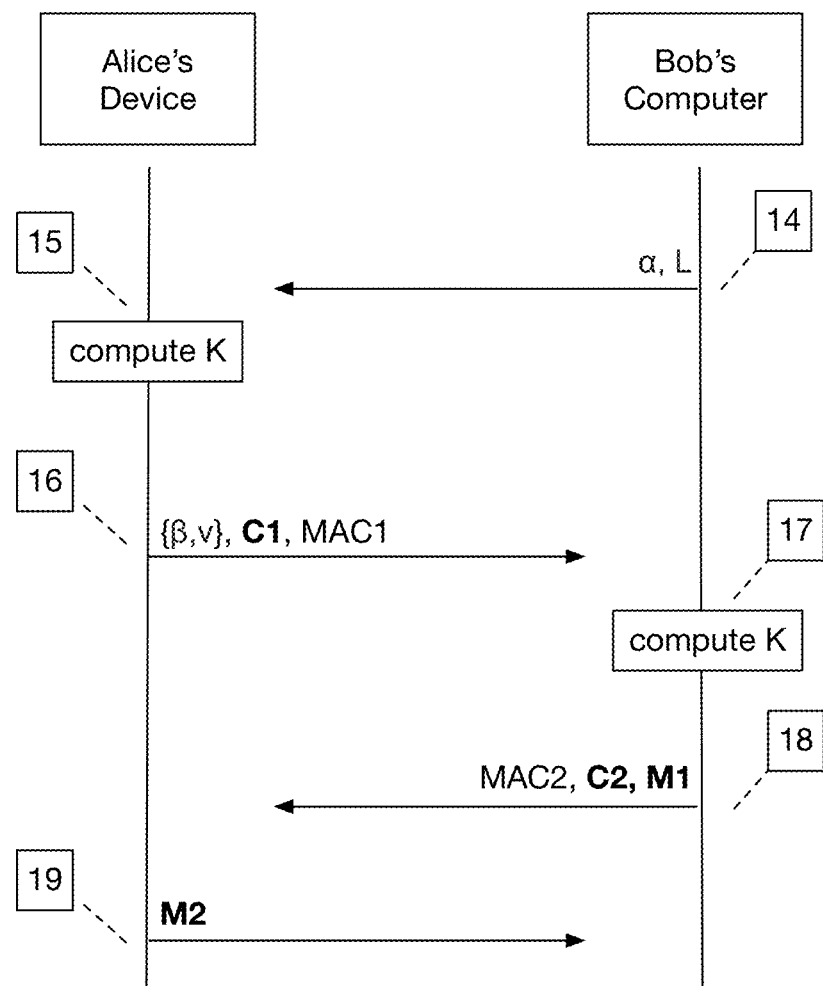
FIG. 3 demonstrates the protocol that facilitates Password Authenticated Key Exchange (PAKE) between Bob's computing device and Alice's online device.

The sequence diagram in FIG. 3 shows an overview of the protocol between Bob and Alice's device. The items presented in bold letters are transferred as ciphertext. For brevity, the diagram does not show the role of the signaling server which stands in the middle of the communication. Whenever direct communication is not possible between the two end points, the signaling server relays the data.

In [14] Bob sends an authentication request to Alice's device. The request contains an identifier L and the DH-OPRF parameter a. Upon receipt of the request, Alice's device looks up R and either locates K in X, or computes it using K=$F_A$(k; x)) [15]. Then, the device replies to Bob [16] with DH-OPRF values {β, v} and a command $C_1$ sent as ciphertext E($C_2$). The function E(·) denotes symmetric encryption with key K. The reply also includes a Message Authentication Code (MAC) denoted as MAC1. This value is a MAC of (α, β, v, E($C_1$)) computed using key K.

Upon receiving these parameters, Bob derives DH-OPRF symmetric key K [17] and verifies that MAC1 message authentication code is correct. To accomplish this verification, Bob computes a MAC of $\{\alpha, \beta, v, E(C_1)\}$ by himself. If the computed MAC equals to MAC1, then this proves to Bob that Alice is not an impostor. Bob also processes the received command $C_1$ and forms the response command $C_2$. Then, Bob sends secret data $M_1$ and $C_2$ to the device [18]. Both are sent as ciphertexts $E(M_1)$ and $E(C_2)$. He also sends a MAC (denoted as MAC2) of $(\alpha, \beta, v, E(C_1), E(C_2), E(M_1))$ based on K, and the lookup identifier L. The lookup identifier is resent in order for Alice's device to lookup the record again, but it can be replaced by a reference token that Alice's device would include in the first response to Bob [16]. The lookup identifier or a reference token, or both, can be included in the MAC computation to better defend from replay attacks.

In [19] the device verifies MAC2. If it is not correct, the device aborts and returns an error. Otherwise, it processes the received command $C_2$. If it does not accept the command because Bob's permissions in sub-record P do not permit the request, it also aborts and returns an error. Otherwise, it stores $M_1$ in user record U and releases the secret M (denoted as $M_2$) to Bob.

The invention can be modified for Alice's device to allow to use the same lookup identifier for several different people, by accepting several valid passwords $x_2$ per lookup identifier L. This can happen, for example, if a news agent Alice uses L with value "alice-journalists" with journalists Bob and John. In order for Alice's device to distinguish between a request from Bob and a request from John, the protocol is modified as follows. In the first reply [16], the device will compute and send several candidate MAC1 values, each derived from a possible key $K_i = F_A(x_i)$. It will also send ciphertext variants $E(K_i; C_1)$ of command $C_1$ per each candidate key $K_2$. Bob will find the MAC that matches with the key K that he derived, and will decrypt the corresponding ciphertext of $C_1$ using that key. Upon receiving the reply from Bob containing MAC2 [18], the device will compare MAC2 against a MAC derived from each possible key $K_z$ until there is a match. Because MAC2 is based on ciphertexts $E(C_2)$ and $E(M_1)$, no decryption attempts are necessary to form MACs until a matching MAC is found. If a match is found, then the device will decrypt and process $C_2$ and $M_1$ using the identified key K. The device will also encrypt its subsequent communication to Bob using that key.

Thus, Alice can group all her communicating parties into groups of hundred, and use identifiers "alice-for-journalists", "alice-for-friends", "alice-for-coworkers" and so on. Such a choice makes it harder for an attacker to identify from the plaintext metadata with whom Alice is communicating.

The same situation to accept several possible passwords occurs in the context of an OTP sequence. If an OTP sequence is accepted by the device, then there is a possibility that Bob will skip several generated codes. Therefore, Alice's device will need to consider a sliding window of several possible passwords $x_2$ that Bob may use.

Accepting several valid passwords instead of one makes a brute force attack easier. To account for that, the difficulty of the passwords should be increased in order to maintain the same level of security. For example, if the original password was a four digit passcode, then to permit up to a hundred possible passwords per a request on L, it suffices to use six digit passcodes instead.

The purpose of commands $C_1$ and $C_2$ is to negotiate a new password for the next time that Bob wants to communicate with Alice's device. The command $C_1$ contains a set of offers by the device for the next password. The device builds this command by consulting Bob's permissions listed in sub-record P in the device's onboard database. The command $C_2$ lists Bob's acceptance of one of the offers, or a combination of several offers. An offer may be a permanent password, a finite sequence of single use passwords, a set of parameters for generating an infinite One Time Password (OTP) sequence, a set of constraints for Bob to set his own password (for a limited or permanent use), or a combination of several of these options.

Figure 4:
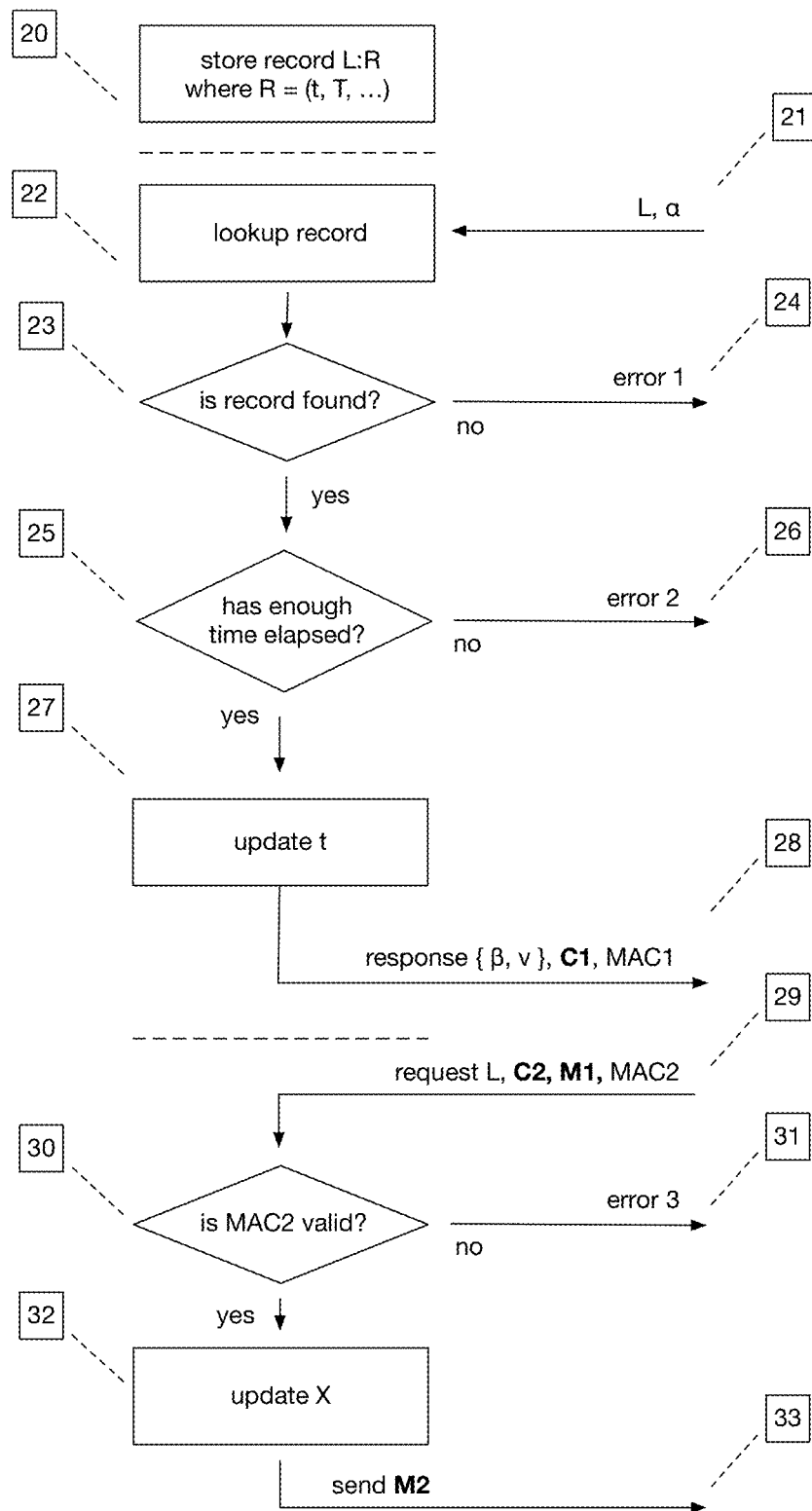
FIG. 4 demonstrates how Alice's online device is able to authenticate Bob, and to limit repeated attempts to guess the password.

The flow chart in FIG. 4 shows error handling that is performed by the device to thwart brute force attacks. The device keeps in record R a timestamp t [20] set initially to null. Bob's authentication request arrives [21] and the device uses L to look up t [22]. If no record was found [23] an error is returned [24]. Based on the current time and the value of the timestamp t, the device verifies that the previous authentication attempt, if any, occurred earlier than a minimum waiting period [25]. If that is not the case, then an error is returned [26]. Otherwise, the timestamp value is updated to the current time and is stored in record R [27]. Then, the device sends DH-OPRF values $\{\beta, v\}$, $C_1$, and MAC1 to Bob [28].

The device now waits for Bob to send the next request. Bob receives the DH-OPRF values, derives symmetric key K, and computes the MAC2 message authentication code. Then, he sends them to the device [29]. Data units shown in bold font are sent in ciphertext, symmetrically encrypted with key K. Upon receipt, the device verifies correctness of MAC2 [30]. If it is incorrect, then an error is returned to Bob [31]. Otherwise, the device continues with the protocol [33].

Figure 5:
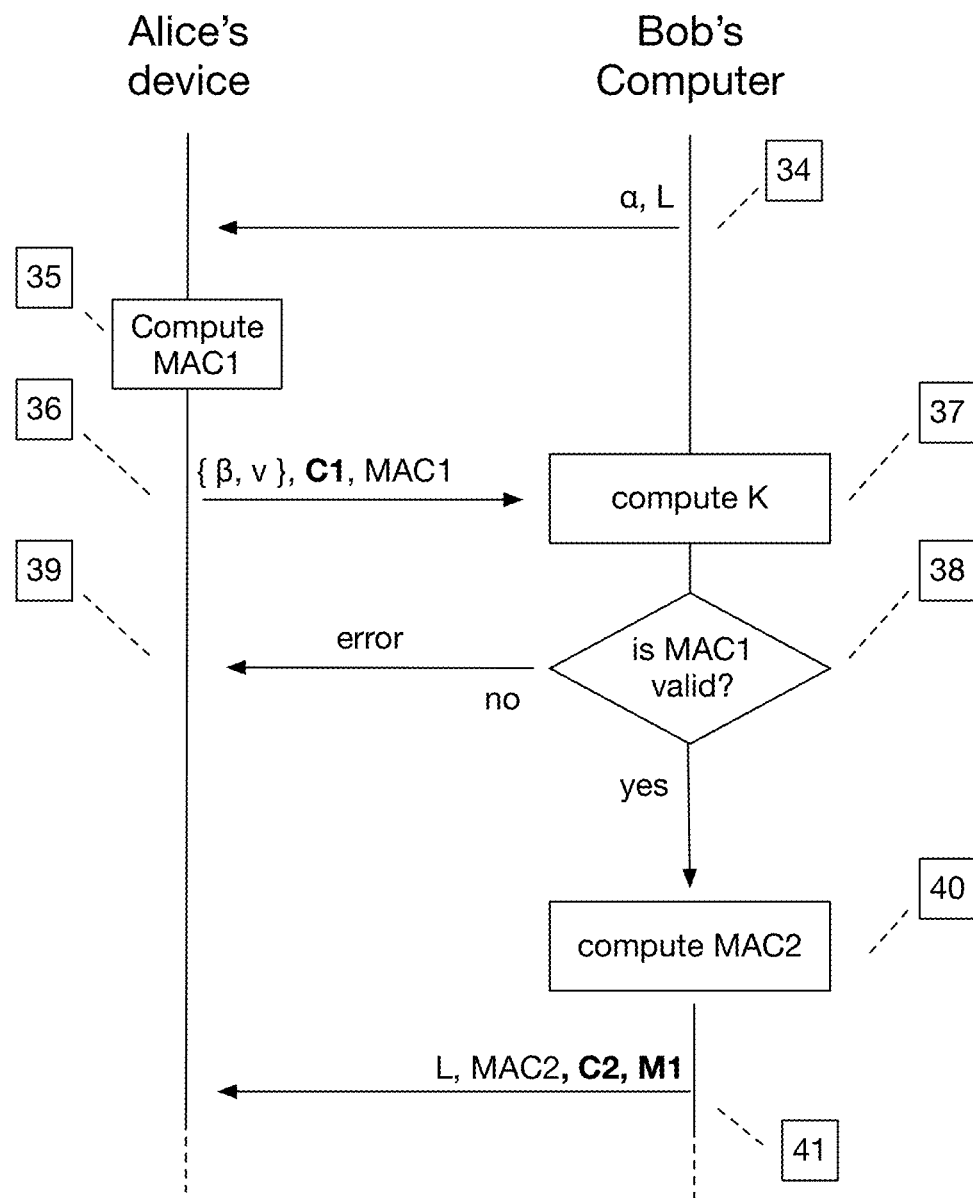
FIG. 5 shows how Bob can authenticate that he is communicating with Alice's device, rather than an impostor.

FIG. 5 focuses on Bob's side to demonstrate how he authenticates Alice's device in the authentication component of the protocol. After Alice's device receives the initial authentication request [34], it computes MAC1 [35] and includes it the response to Bob [36]. Bob receives MAC1 and DH-OPRF values $\{\beta, v\}$ and uses the latter to derive symmetric key K [37]. In step [38] he verifies MAC1 [34]. If verification fails, Bob notifies the device of an error and does not proceed further [39]. Otherwise, Bob computes MAC2. Then, he encrypts $C_2$, $M_1$ with K and sends their ciphertexts to the device, along with lookup identifier L and MAC2 [41].

The error [39] occurs if there is a password mismatch between Bob and Alice's device, which tells Bob that he may be communicating with an impostor of Alice. Bob may retry by re-initiating the protocol again with the same password, and hoping that he will reach the device of the real Alice. However he should retry at most W(x) times per password x. The upper limit W(x) is a number such that the probability of guessing the password in W(x) attempts is sufficiently small. If Bob retries the password too many times, it means that a Man-In-The-Middle (MITM) adversary posing as Alice to Bob has a chance to brute force the password that Bob uses. For example, if x is a four digit number, then the probability of guessing it in W(x)=10 attempts is $\frac{1}{1000}$. After having guessed the password, Eve can pose as Bob and retrieve the secret from Alice's device.

Alice must advise Bob not to retry more than W(x) times in case he can not verify her identity [39]. She may advise him of this fact at the same time that she communicates the password to Bob. She may also communicate this advice when she communicates L to Bob. If Bob fails to heed the advice, then Eve who determines the password through many retries, may cause damage to Alice by impersonating Bob and stealing secret M that Alice planned to share with Bob only.

If Alice suspects that Bob may introduce a human error by not correctly following the advised protocol, she should agree on a stronger password with Bob. For example, a six digit PIN would require a 100 times more retries to brute force than a four digit pin. In other words, Eve would get the right password at probability of $\frac{1}{1000}$ if Bob retries 1000 times to retrieve the message from her. It order to avoid too many retries, Bob's software should not retry automatically, but should require Bob to manually operate his computer for each retry.

If Bob uses a permanent password x, and he observes w(x) authentication failures of Alice, then he should set a new password upon the next successful authentication. The parameter w(x) is a smaller number than W(x), and is used to prevent Bob from retrying close to W(x) retries, as authentication failures accumulate over a course of time. The value w(x) should be less than half of W(x) in order to allow for honest errors.

For example, suppose Bob uses the invention to exchange secrets with Alice frequently over a course of one month. He has agreed with Alice on a permanent password $x_p$. Over the course of the month, he observes five authentication failures, which could have occurred because he mistyped the password. However, each of those failures could have been a result of an adversary Eve posing as Alice and attempting to guess the password. This would allow Eve to accumulate many guesses for the permanent password overtime, and succeed in brute forcing the permanent password.

If Bob sets a permanent password, then the device may deny to retrieve the same secret again, but may be configured to permit retrieving only new secrets. In this case, the device will delete M from the record R after it was transmitted to Bob. Alice will set M to a new value when she has a new secret to share with Bob.

Apriori, Alice manually configures record P in her device to specify constraints on what Bob can set in $C_2$. In the preferred embodiment the first password x is a one-time password and can not be reused again. The device declines the choice of parameters sent in $C_2$ if the request is not permitted by permissions listed in record entry P. In this case, the device will return an error response and would not release secret $M_2$ to Bob.

If Bob does not need to retrieve secret data from Alice in the future, he sets the $C_2$ parameter [18] to ("expire"). Upon receipt of this command, Alice's device deletes k, X, M from Bob's record R stored on the device and denies any future authentication requests with lookup identifier L. Her device also notifies the signaling server to delete the record (L, I).

If Bob agrees to the new password offer in $C_1$, he sets $C_2$ parameter to ("accept"). Otherwise, he specifies his new password offer in $C_2$. The password offer can specify a permanent password $x_p$ by command ("permanent", ($k_p$, $K_p$)), where $K_p$ is derived by Bob from x, according to $K=F_A(k_p; x_p)$. Here, $k_p$ is randomly chosen by Bob and is not remembered or stored by Bob after the exchange. If the device accepts the password offer, it stores $K_p$ in X and sets k:=$k_p$ in record R.

The password offer can specify a finite sequence of one-time passwords by the command ("otp-list", {$x_1$, . . . , $x_n$}). If n=1, then the offer specifies a password for next retrieval only. Also, the password offer can specify a One Time Password (OTP) generator by command ("otp", <generator type>, <parameters>). In order to support Second Factor Authentication (2$F_A$), the password offer can contain both a request to set a permanent password as well as an OTP sequence. Bob can use off-the-shelf solutions for storing the sequence of OTPs. For instance, Bob may scan a QR code using the Authenticator device (or mobile app) in order to store the sequence.

Figure 10:
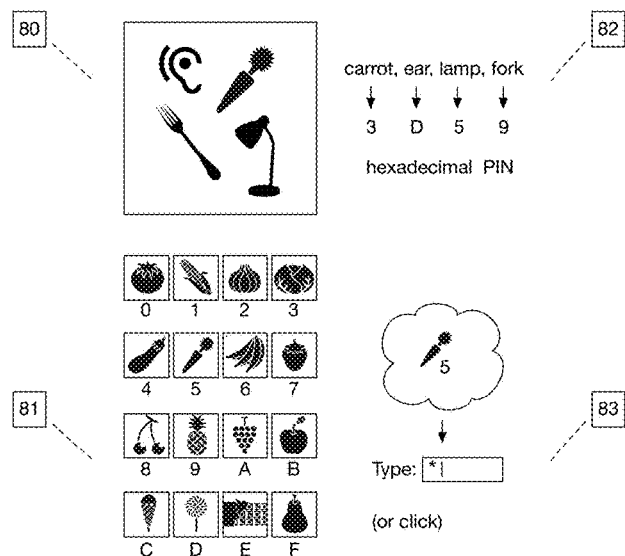
FIG. 10 presents a possible implementation of a visual password scheme.

Visual passwords can be used as shown in FIG. 10, in which the textual password is represented by an alternative non-textual media which is converted to textual representation by a computing device. Such passwords are easier to remember and are easier to communicate by telephone, or in person, because there is no danger of misspelling. Because the invented method requires only a low-entropy password, a convenient visual password scheme can be devised in variety of ways. For example, a hexadecimal digit from 0 to F may be represented as a choice of an image from a 4×4 image grid [81]. A computing device may present four such grids, such that each grid has images from the same subject category, and the order of categories is fixed. If the ordered categories are "food," "body parts," "household," and "furniture," then Alice and Bob may agree on the images of "carrot," "ear," "lamp," and "fork" for the password. This would be a password with 16 bits of entropy. Bob does not need to remember the order of the objects, because his computing device would prompt him with a grid of images in the correct order. In fact, Bob can remember the four objects combined into a single image [80]. Bob would either click on the images, or would type in [83] the corresponding digits under the images, to protect the password from shoulder surfing. The sixteen possible objects in each category should not be similar in order to selection errors. For instance, there should not be both a "stool" and a "chair" in the furniture category, since a stool is a kind of chair. The images may be presented as photos, clipart or emoticons. The images can also be replaced by video clips of actions instead of objects (i.e. "jumping").

In contrast, in a textual password scheme, Alice and Bob may agree on a single word "carrot" as the password, because the set of possible simple words is much larger than 16. However, Bob would have to type it, not select from a grid of images, since there would be too many possible images to display.

Bob may use a variety of computing devices to initiate the exchange with Alice's device. He can use his own personal computing device, such as a mobile smartphone, laptop, or a desktop computer with access to the Internet. Alternatively, he can use a computing device of a third party, provided that he trusts the software that he operates. He may accomplish higher level of trust by carrying a copy of the software on a Universal Serial Bus (USB) stick and inserting it into the computer of the third party. The contents of the USB stick may contain a stan-dalone application, or a web application that will be opened by a Web browser on the computer. It can also provide an isolated operating system (OS) that can run virtualized on the host OS, or he can boot the third party computer into the OS on the USB stick. Alternatively, he can use the Web browser of the third party computer with an online Web application, if he can verify its legitimacy. The URL of such web application may include the lookup identifier. For example, the lookup identifier may be "https://example.com/alice17." If Bob is a tourist, he may use a third party computer in an Internet cafe. In a self-service printing kiosk which has an Internet workstation, Bob may receive a private document from Alice using the invented method, and then he may immediately print it without storing it digitally in an unsecured medium.

The signaling server assists with communication between the endpoints (the device and Bob). The signaling server is necessary if a Push Notification is required to trigger Alice's device, but such notification cannot be transmitted directly from Bob's device. It is also beneficial to facilitate communication in the presence of firewalls and private LAN networks. Because the preferred embodiment assumes that Alice's online device is a smartphone, the signaling server is necessary. The URL of the signaling server must be known to Alice and Bob in advance of the protocol initiation. As mentioned earlier, the URL can be made part of identifier L. Alice must reach the signaling server in order to register record (L, I). Bob must reach the signaling server in order to wake up her device via a Push Notification.

Figure 6:
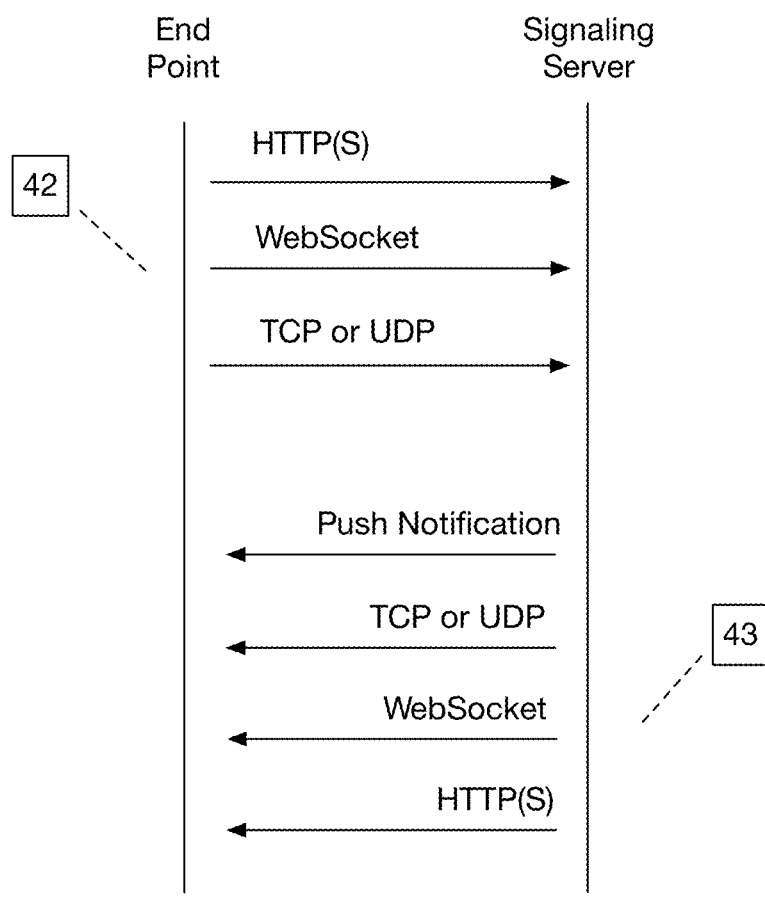
FIG. 6 shows different ways in which a signaling server may communicate with Bob's or Alice's device (the end points)

The signaling server may communicate with an endpoint using several methods, some of which are illustrated in FIG. 6. When the endpoint is a device which has not initiated a TCP connection with the server, the server initiates the connection with the device by a Push Notification [43]. The Push Notification will wake up the device and a program designed to handle the Push Notification will be activated. Then, the device and the signaling server can communicate bidirectionally using a variety of protocols, such as HTTP, HTTPs, TCP, or UDP.

Figure 7:
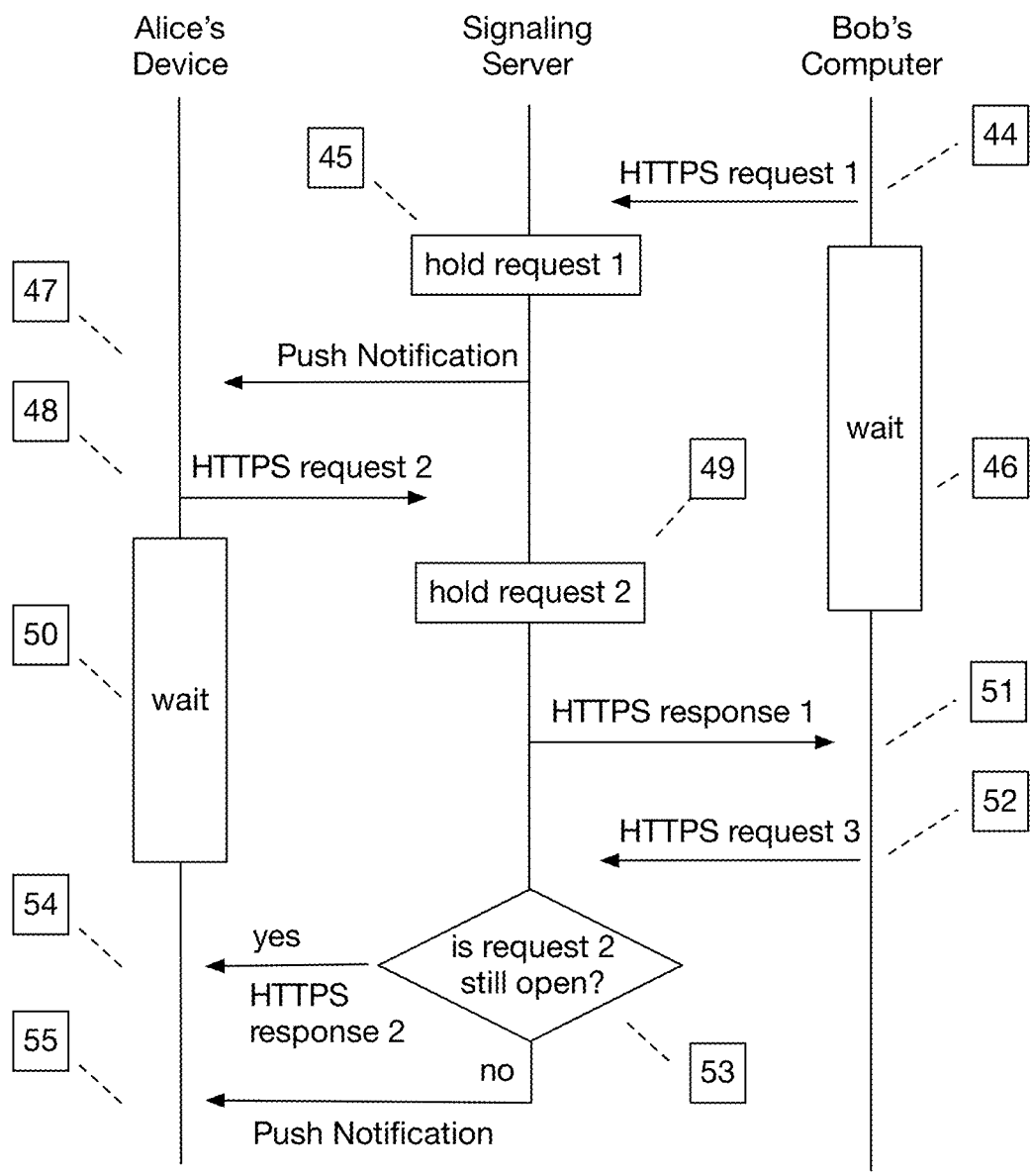
FIG. 7 demonstrates how signaling server can be embodied to relay data between Bob and Alice's device using HTTPS requests and Push Notifications.

The preferred embodiment of the signaling server communication is presented in FIG. 7. In this embodiment, the endpoints always communicate via the signaling server, and do not attempt to establish a direct peer-to-peer connection. The signaling server receives HTTPS requests and does not respond immediately to them. It keeps the requests in a pending state until data for a response is ready. Bob initiates the protocol by sending an HTTPS request to the signaling server [44]. The server places the request on hold [45] and sends a Push Notification to Alice's device [47]. In the meantime, Bob is waiting for a response to his HTTPS request [46].

Alice's device is woken up, processes the data received in the Push Notification and sends a reply to the signaling server [48]. The signaling server receives and holds this request as well [49]. The device is waiting for the response [50]. The signaling server now replies to the HTTPS request from Bob [51] in which it sends the data received from the device. Bob prepares a response for the device and sends it in HTTPS request #3 [52]. The signaling server checks if HTTPS request #2 has not timed out and that the associated TCP socket is still in an "open" state [53]. If the socket has closed, then the server sends another Push Notification [55]. Otherwise, the server sends an HTTPS response to the device [54].

The communication continues in this fashion. The server holds a response to HTTPs request #3 in a similar way as HTTPS request #1 was held. It will send a response to it after it has received data from the device. Because only two rounds of communication are necessary (see FIG. 3), the process stops at that point.

The signaling server records, under the lookup identifier L, an identifier I of Alice's device on the Push Notification network. Optionally an expiry time can be set by the device. The server can delete this record if the device unregisters itself, or if the registered record is marked for deletion after a successful exchange has occurred, or if the record has expired.

The signaling server inspects the plaintext components of the data it relays to observe whether an error was transmitted by either side. Based on this information the server can optimize its operation. For example, the signaling server may store a partial state of Alice's device in order to filter abuses of the protocol. If the device no longer has record for L, or if there is a waiting period on L as a result of previous authentication errors, then the signaling server will not send Push Notifications to the device. This prevents denial of service attack via unnecessary Push Notifications. The partial state is created only after the device sends an error reply. Furthermore, after a long period of inactivity, partial state of the device can be deleted from the server.

If, in another embodiment, the endpoints switch to a direct peer-to-peer TCP communication, then the device should notify the signaling server about error occurrences and whether the registration record (L, I) can be deleted. This would allow the signaling server to optimize its operation as outlined.

The preferred embodiment for Alice's computing device is to be an Android or an iOS mobile device with a mobile application to handle the protocol. Because, at present, these two operating systems together hold 98% of the smartphone market and offer a high degree of personal privacy, such an embodiment is accessible to laymen.

Assume, without loss of generality, that the mobile application is called AppAlice. Because storage is limited on smartphones, the necessary state can be stored externally in encrypted form and downloaded only when Bob makes a request to Alice's device. In this case, Alice's device stores locally the lookup identifier and a timestamp, and uses a cryptographic symmetric master key to encrypt the state which includes that timestamp. When the state is downloaded, the timestamp is checked against replay attacks. After each exchange with Bob, AppAlice updates the timestamp and the state, to protect against replay attacks. In preparation for the first exchange, AppAlice does not need to store anything locally and can trust the downloaded state, as long as the timestamp is greater than the date at which AppAlice was installed. Timestamps earlier than install date can be seen post reinstall, and in this case AppAlice can prompt Alice to explicitly approve external records and update the timestamps.

If the embodiment of AppAlice does not store state before the first exchange with Bob takes place, then Alice may use a secondary computing device, such as a desktop computer running software or a Web Application, to create a record in external storage to be downloaded by AppAlice when Bob initiates the exchange. The record can be encrypted with the same master key that AppAlice uses, or with a public key for which AppAlice has the corresponding private key. When Bob initiates the first exchange with Alice's device, her device uses the lookup identifier in Bob's request to lookup and download the state.

The embodiment on Android is simpler than the embodiment on iOS. That is because Android activates the corresponding terminated application when a Push Notification for that application arrives. On the other hand, upon receiving a Push Notification, an iOS operating system would not activate an application if it is in a terminated state. In order for the invention to be practical for laymen, it is important to design the preferred embodiment to work even if the application of interest is in a terminated state. For these reasons, the embodiment for iOS device will be presented in detail, but details about an Android embodiment will be skipped for the sake of brevity.

Figure 8:
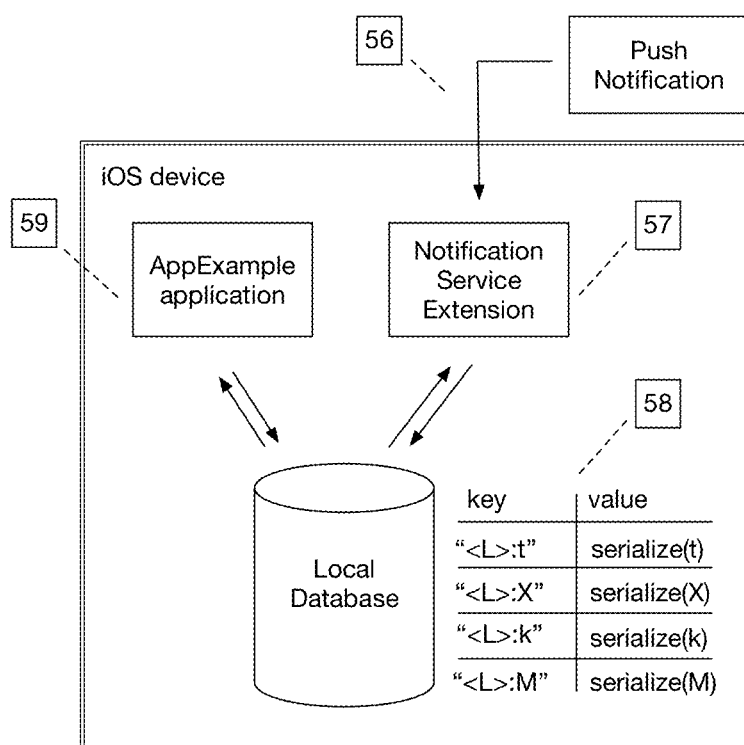
FIG. 8 demonstrates how Alice's online device may be embodied as a mobile application on an iOS smartphone, equipped with an associated Notification Service Extension (NSE) to handle Push Notifications whenever the mobile application is in a terminated state.

The preferred iOS embodiment assumes that the mobile device in FIG. 8 is running iOS Operating System (OS) of at least version 10. In this embodiment, Alice installs a mobile application "AppExample" on her device [59]. This application is packaged as part of a larger application bundle which, in addition to the AppExample application, also contains an associated Notification Service Extension (NSE). The iOS operating system installs the NSE at the same time as it installs the application. The extension and the application are associated to the same iOS application group and share a shared key-value database [58] accessible only to them, and the part of the database that has confidential data is not backed up in Apple iCloud.

The keys in the database are formed by concatenating the value of L lookup identifier and a suffix corresponding to the data stored. For example, if L is "bobAexample.com", then the key for the timestamp t will be "bobAexample.com:t." The data values are serialized and stored as strings. Binary values such as the salt k are serialized into strings using Base64 encoding. Data structures in R are encoded in JSON, with any binary data components serialized using Base64 encoding. In an alternate embodiment of the invention, another shared storage mechanism can used.

The signaling server sends the a Push Notification to the Apple Push Notification Service (APNS) with alert text set to $T_0$. The APNS delivers this Push Notification to Alice's mobile device [56]. The iOS operating system inspects the "topic" parameter for the bundle ID and invokes the associated NSE [57].

The payload of the Push Notification contains parameters $\{\alpha, L\}$. The signaling server can include any additional data in the payload provided that the total length of the Push Notification is less than the present limit of 2 kilobytes. For example, the signaling server can include a URL to which further protocol communication should be directed, such as the URL of this signaling server, or of another server, or the Internet Protocol (IP) address of Bob's computing device.

The NSE decodes the custom payload in the Push Notification and extracts parameters $\{a, L\}$. It retrieves record R from the database [58]. Then, it engages in a communication protocol according to the scheme outlined in FIG. 7. It stores updates to the record by updating the corresponding values in the database. Whenever the AppExample application runs, it synchronizes its state with that database.

Figure 9:
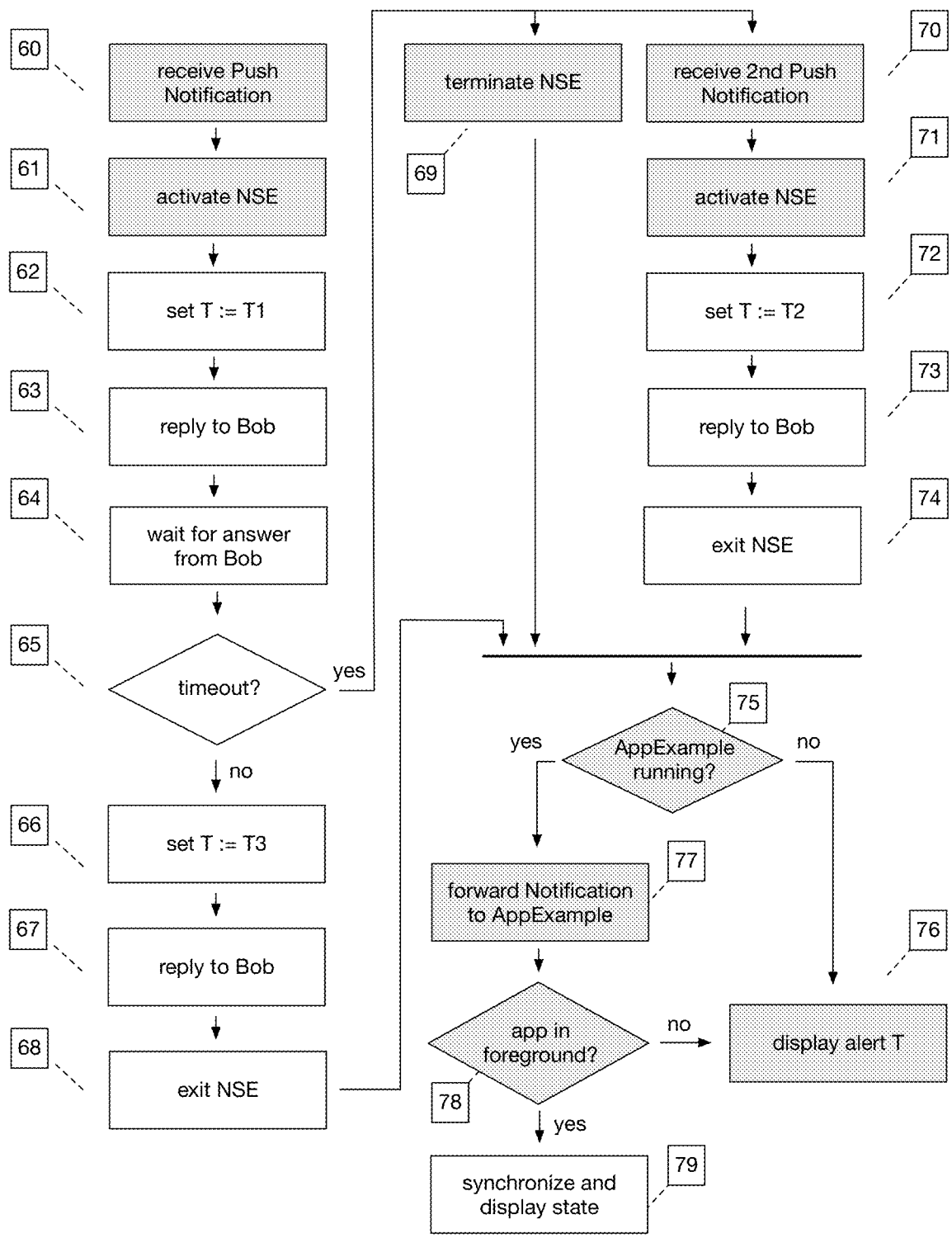
FIG. 9 is a flow chart demonstrating the integration of the iOS mobile application with the associated NSE, and the presentation of minimal alert messages mandated by iOS when Push Notifications are received but the mobile application is in a terminated state.

FIG. 9 details the flow of control in the preferred iOS embodiment of device software. The greyed boxes represent control by the iOS operating system, and the remaining boxes represent control by the NSE or AppExample application. The initial alert text in the Push Notification is set to $T_0$ which will be displayed only in case of unexpected errors inside the NSE program. Otherwise, either alerts $(T_1, T_2)$ will be displayed or only $T_3$ will be displayed.

The flow begins with the Push Notification arriving at the mobile device [60]. It is directed to the NSE [61] by the operating system. The NSE sets the alert text to $T_1$ [62] and sends a reply to Bob's request [63], [16] (in FIG. 3). The NSE waits for Bob's answer [64] [46]. If the answer is received before timeout [65], then the alert text is set to $T_3$ [66]. Also, the NSE replies to Bob again and exits [67], [68], [19] (in FIG. 3).

However, in case of timeout, the operating system will terminate the NSE [69] and the signaling server will be sending a second Push Notification [70], [55]. When the second Push Notification arrives, the operating system activates a new instance of the NSE [71].

The NSE determines its own state by considering the request parameters in the Push Notification payload, as well as by using additional temporary entries in the database [58]. If the NSE identifies that the previous NSE timed out waiting on a reply from Bob, then it treats the payload of the Push Notification as that reply [29]. In this case, it sets alert text to $T_2$ [72], replies to Bob [73], [19] and exists [74].

After each NSE terminates, the iOS operating system checks if the AppExample application is running [75] in foreground. If it was terminated or if it is running in the background, then the operating system displays an alert notification with the text T [76] and the flow ends. Otherwise, the Push Notification is forwarded to the AppExample application [77].

The application synchronizes with database [58] by reading updates set by the previous invocations of the NSE. It then displays updated state to Alice [79]. For example, if Bob sent secret $M_1$, then this secret will be displayed to Alice when Alice operates the smartphone to read it.

The preferred iOS embodiment does not specify exact alert texts $T_0, T_1, T_2, T_3$, but outlines general constraints and offers examples. The text in $T_0$ is set by the signaling server given the knowledge of the lookup identifier L. For example, if L contains "alice-mailbox-7", then the signaling server may extract it and include it in the text of $T_0$. If Alice's device has more information about the identity of the person identified by L (e.g. his full name), then that information may be included in the texts $T_1, T_2$ and $T_3$. Furthermore, text $T_1$ and $T_2$ may present incremental information to the user, because both of them will be displayed in sequence. For example, $T_1$ may indicate that a request was initiated, and $T_2$ may indicate whether it was successful. Text $T_3$ may include all relevant information. For example, the texts could be:

$T_0$ "Activity with alice-mailbox-#7."
$T_1$ "Activity from Bob Smith (bob@example.com)."
$T_2$ "Information exchanged with Bob Smith." or "Exchange failed with Bob Smith."
$T_3$ "Information exchanged with Bob Smith (bob@example.com)." or "Exchange failed with Bob Smith (bob@example.com)."

Alice can manually operate the AppExample application and delete records in order to deny all further authentication requests for specific lookup identifiers. In this case, the application must synchronize the changes with the database [58] shared with the NSE.

An alternative embodiment is possible for iOS platform that does not require showing user alerts, and in which the NSE is not required, but the AppExample application must be running either in foreground or in background. In this case, the signaling server sends a Silent Push Notification and when it arrives at Alice's device, the iOS operating system relays the notification to the AppExample application. Then, the application communicates with Bob's device according to the invented protocol. The same type of embodiment may be implemented on the Android platform: an Android AppExample application may be in a terminated state when the Push Notification arrives, but the Android OS will activate it and relay the notification to it.

Figure 11:
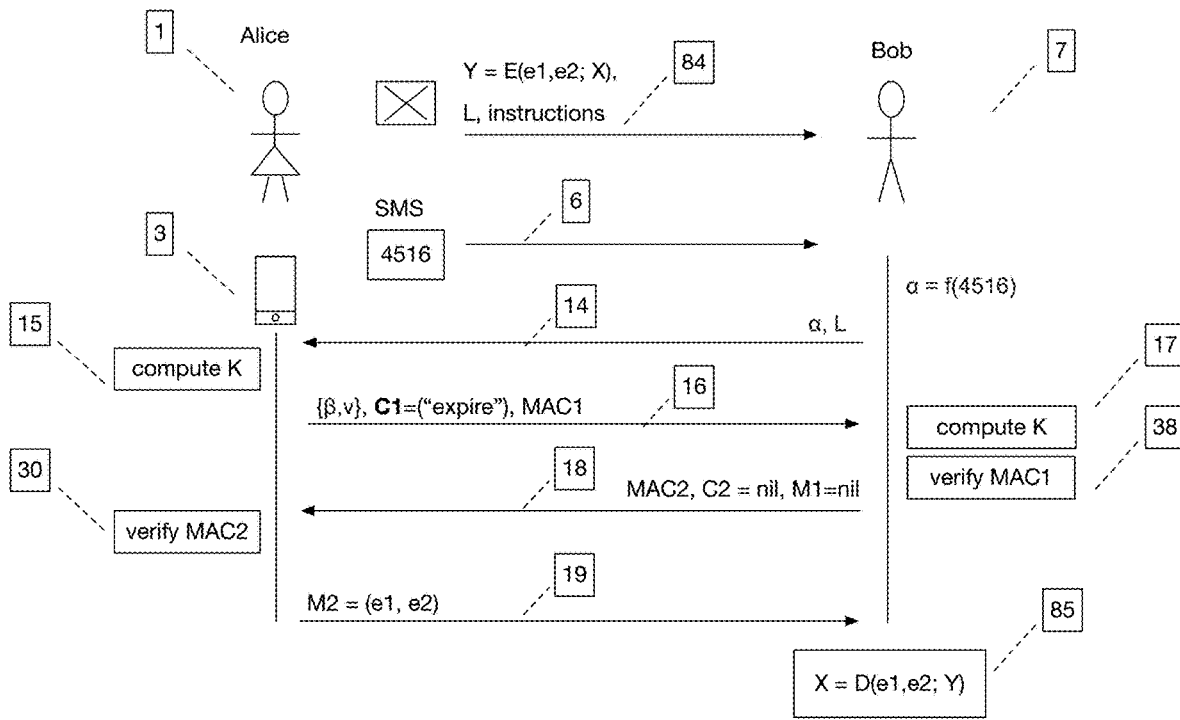
FIG. 11 presents example scenario for email encryption using symmetric key.

The following hypothetical scenarios demonstrate the operation of the invention. In scenario #1 shown in FIG. 11, Alice wants to send to Bob an encrypted email, but does not know his Pretty Good Privacy (PGP) public key. She encrypts [84] the main content of the email with $\{e_1, e_2\}$ where $e_1$ is an AES-GCM symmetric key, and $e_2$ is an initialization vector to the AES-GCM algorithm. As a postscript to the email, she advises Bob to download a desktop application Desktop-App-Example to decrypt the email. She also includes explicitly and in plaintext a lookup identifier L. She sets P, M, L, x in the record R of her AppExample mobile device application, where $M=\{e_1, e_2\}$, L is a random string, P is ("once-only") and x is the code "4516". Her AppExample application registers with the signaling server, and Alice then sends Bob an SMS with the passcode "4516" [ ]. Suppose that Bob is a user of MacOS operating system. When he opens the email using his computer, he follows the instructions, and installs from the Apple App Store the Desktop-App-Example application suggested by Alice. The desktop application asks Bob to provide the lookup identifier L, which he copies and pastes into the software. The software then asks Bob to enter the password he received from Alice. Finally, Bob is asked to copy and paste the ciphertext that he received in the email into the desktop application. The desktop application then engages in the invented protocol to retrieve $e_1$, $e_2$ in $M_2$ from Alice's device [85]. During the protocol exchange, the mobile device inspects P, and as a result sends $C_1$ as ("expire") [16]. Bob's desktop application sends $C_2$ and $M_1$ as null [18]. After the protocol exchange is complete, the decrypted content of the email is displayed to Bob.

Figure 12:
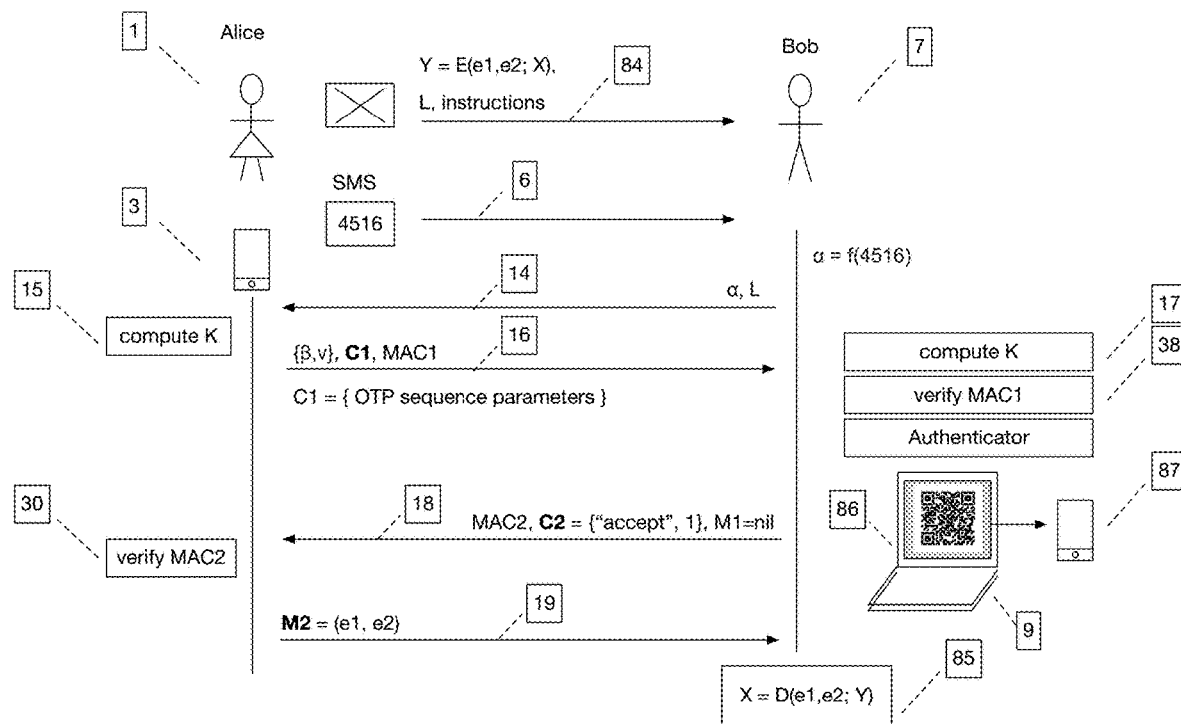
FIG. 12 presents example scenario for using One Time passwords.

In a hypothetical scenario #2 shown in FIG. 12, Alice will engage with Bob in a similar process as in scenario #1. However, Alice sets P sub-record on her device to "TOTP" and includes in $C_1$ the parameters of the TOTP sequence generator. After Bob reads the decrypted message, a QR-code is displayed to him by his Desktop-App-Example application [86]. Bob uses a generic Authenticator mobile app [87] to scan the QR code. He then types the first generated code into the desktop application for verification. If the code typed is correct, the desktop application sends in $C_2$ the value ("accept", 1) [18], in which the value 1 represents the number of codes to skip. Upon receipt, Alice's mobile device will update Bob's sub-record X with the OTP sequence parameters, noting that the sequence will skip the first and start from the second generated code. The next day, Alice sends Bob another encrypted email. She advises him in the postscript to use the same desktop application, and the password sequence he created yesterday. Bob is able to follow the instructions to retrieve the email using the invention. Instead of the password "4516", he types the code generated by the Authenticator. The protocol exchange of the invention will have $C_1$ and $C_2$ set to null. $M_1$ will be also set to null. $M_2$ in [19] will be set to the $\{e_1, e_3\}$ where $e_1$ is the same encrypted key that Alice used yesterday, and $e_3$ is a new initialization vector. Upon receipt of $M_2$, the desktop application will decrypt the ciphertext pasted by Bob, and will display it.

Figure 13:
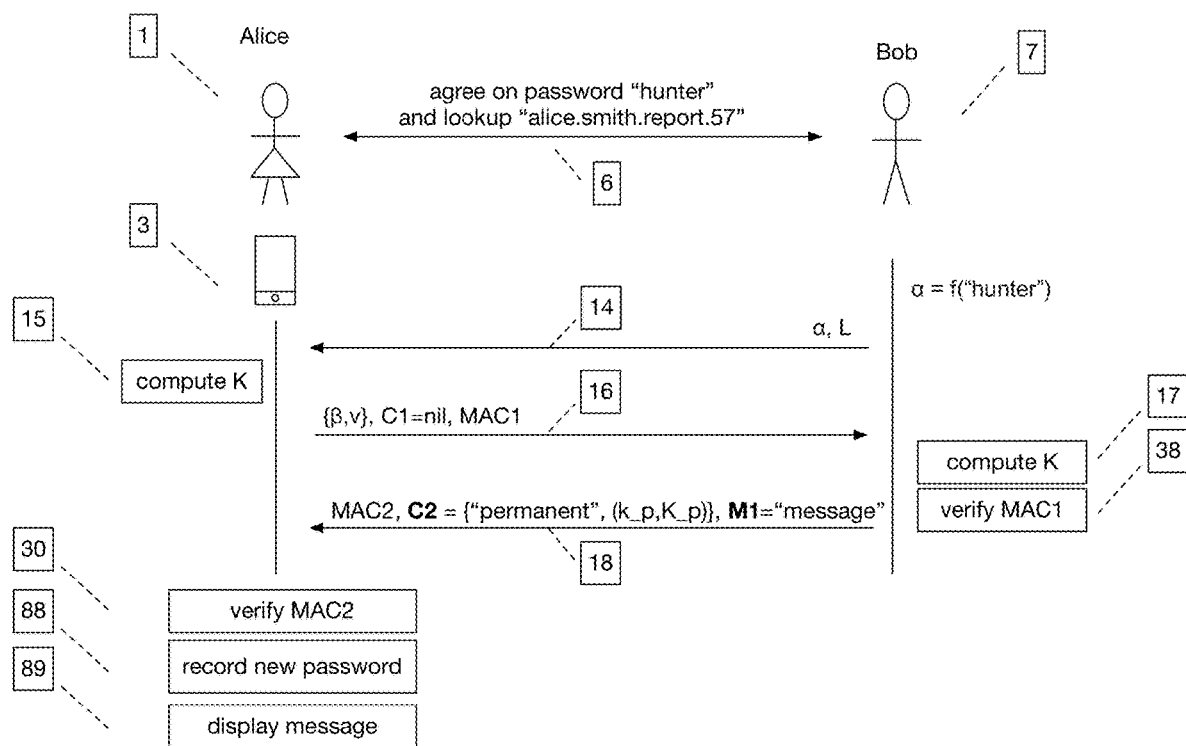
FIG. 13 presents example scenario for a journalist Bob to report a news story to a news agent Alice using a third party computing device.
Figure 14:
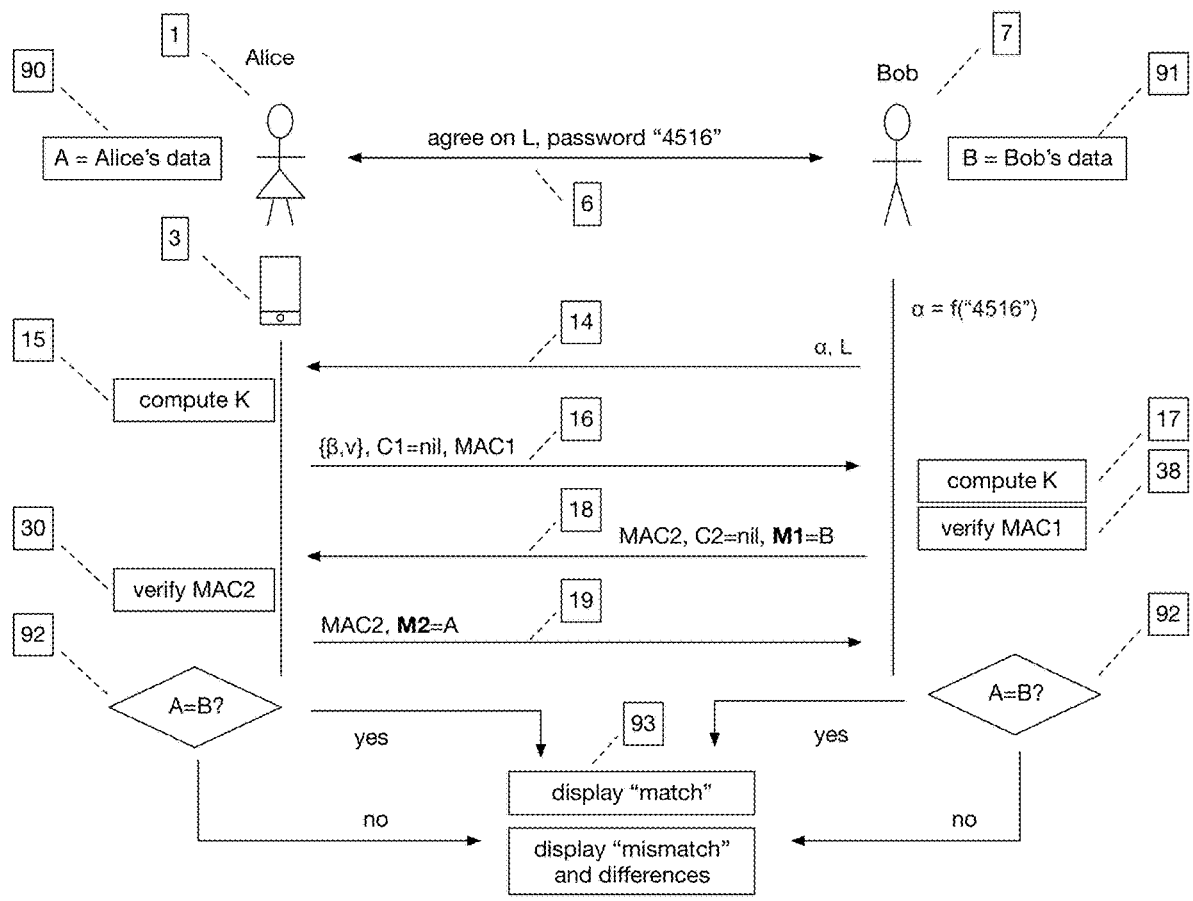
FIG. 14 presents an example scenario in which both parties can check that they have the same data, thereby verifying integrity of data.

In a hypothetical scenario #3 shown in FIG. 13, Alice is a New York news-paper agent, and Bob is a field journalist working in third-world countries. He and Alice agree on an initial password "hunter" when meeting in person. Alice configures her AppExample application on her device. She sets L to hash-code of "al-ice.smith.report.57" and x to the password "hunter". She registers her device with the signaling server, and because the registration is successful, she learns that no one has reserved this lookup identifier but her. She communicates these to Bob, when Bob calls her from New York to discuss how he will send her news reports. She sets M to null, and P to ("accept"). Bob travels to a third world country, and does not carry a computer or a mobile device, but has only a portable Universal Serial Bus (USB) storage drive. The portable drive contains a copy of Desktop-Example-App that is capable to run from the storage drive. When he learns of a newsworthy story, he visits a library or an internet cafe to use a public computer. He plugs the portable drive into the computer and activates Desktop-Example-App found on the storage drive. Then, he enters "alice.smith.report.57", then the password "hunter", and then types the text of the report that he wishes to send to Alice. His program engages in the invented protocol with Alice's mobile device, via the signaling server. The device sends null in $C_1$ and the news story in $M_1$. Bob's software offers Bob to set a new password. Bob accepts the offer and types his regular and already memorized fifteen character long password "duV0gaZ3zho#kby." Then, his software sends in $C_2$ [18] the command ("permanent", ($k_p$, $K_p$)) where the symmetric key $K_p$ is computed from his new password x, as $F_A(k_p; x_p)$, and $k_p$ is a randomly generated salt. Bob's software does not permanently store any of the values computed. It also does not permanently store the report. Upon receipt, Alice's device removes "hunter" from X, stores $K_p$ in X, and updates k in R to the received value $k_p$ [88]. It stores the received report as plaintext in user record U. When Alice attends to her mobile device, she is displayed the received news story [89]. A week later, Bob has a new story that he wants to report to Alice. He again finds a computer, activates his software, but now types his memorized fifteen character long password instead of the old password "hunter". The rest of the communication proceeds as before. Bob is offered again to set a new password, but he declines and stays with the same one. During the protocol, the $C_1$ and $C_2$ parameters are set to null.

In a Verification variant of the invention shown in FIG., both Alice and Bob wish to verify that they have the exact same data. Each side enters data and a shared password, and then awaits a result. The result can either be "the data is the same", or "the data is different". If the data is different, then differences of data can be inspected.

To accomplish this scenario Alice sets the data [90] in $M_2$ [19] and Bob sets his copy of the data [91] in $M_1$ [18]. After the invented protocol exchange is complete, each side compares that $M_1$ and $M_2$ are the same [92]. If they are the same for Bob, then Bob's computer displays a message to that effect [93]. If they are not the same, then in addition a displayed message to that effect, Bob is shown a list of differences between $M_1$ and $M_2$. In the preferred iOS embodiment of the invention, Alice will see a Push Notification alert if the application is not in the foreground. The texts $T_0$, $T_1$, $T_2$, $T_3$ should be modified accordingly to describe whether data matched or mismatched. If they are mismatched, she can use the AppExample application to review the differences. If review of differences is not required, then $M_1$ and $M_2$ each can contain a hash-code of the data instead of the full data. The password instructions in $C_1$ and $C_2$ are set using the same scheme as before, to allow Bob and Alice to use the Verification embodiment again without explicitly sharing a password.

If a review of the differences is required, but the data is large, then the full data can be transferred only in one direction, optimizing for download speed. For example, if the download speed of Alice's mobile device is significantly faster than the upload speed, and if Bob uses a computer with a faster upload speed than that of the device, then Bob will place full data in $M_1$. When the device receives $M_1$, this would constitute a download operation from the perspective of the device. The device incrementally computes the difference between M stored in record R, and the data received so far. The device then stores the list of differences in U. The device then sets $M_2$ to a hash-code of data M and a list of differences observed. Upon receipt of $M_2$, Bob's computer checks if the hash-code that was contained in $M_2$ equals $M_1$. If it is not, then the computer program notifies Bob of a mismatch and also displays a list of differences reported by Alice. If the list of differences is a large amount of data, the device may not include it in $M_2$. In this case, Bob would not be able to view the list of differences.

Figure 15:
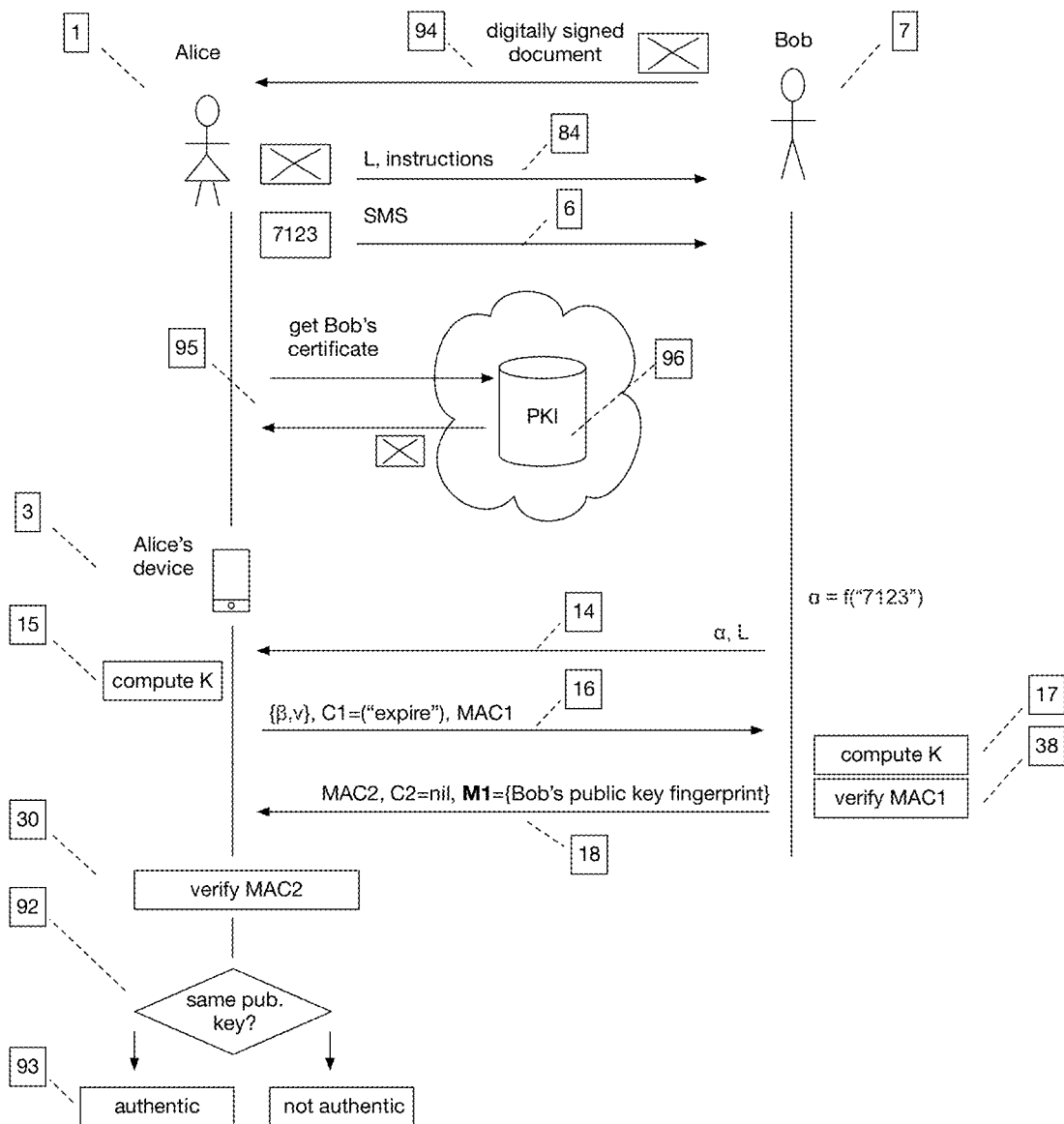
FIG. 15 presents an example scenario in which Alice is able to verify a digital signature of Bob's, by verifying that she obtained Bob's digital certificate from Public Key Infrastructre (PKI) and not that of an impostor.

In a hypothetical scenario #4 shown in FIG. 15 Bob sends [94] a contract to Alice that was signed with his Digital Certificate. Alice uses a Portable Document Format (PDF) Reader program to review the contract. The program downloads Bob's Digital Certificate from a Public Key Infrastructure (PKI) system [96]. Alice can see that someone by the name of Bob has signed the document, but would like to verify that it was not signed by an impostor of Bob. To accomplish this, Alice and Bob will use the verification variant of the invention. Alice inspects [95] the details of the Digital Certificate of Bob and takes note of the fingerprint value. She configures her AppExample mobile application by setting M to the fingerprint value, and setting P to "once-only". She sends Bob an email in which she advises him to install Verification-App-Example application, and how to find the fingerprint of the Digital Certificate, and also advises him to enter it into the application. She sends him by IM the passcode "7123." Bob takes note of the passcode, and performs tasks as advised in the email. When he submits the information, his computer will engage in the invented protocol with Alice's device. If the fingerprint [18] received in $M_1$ is the same as the value in M, then Alice can be confident that the document was not signed by an impostor.

Figure 16:
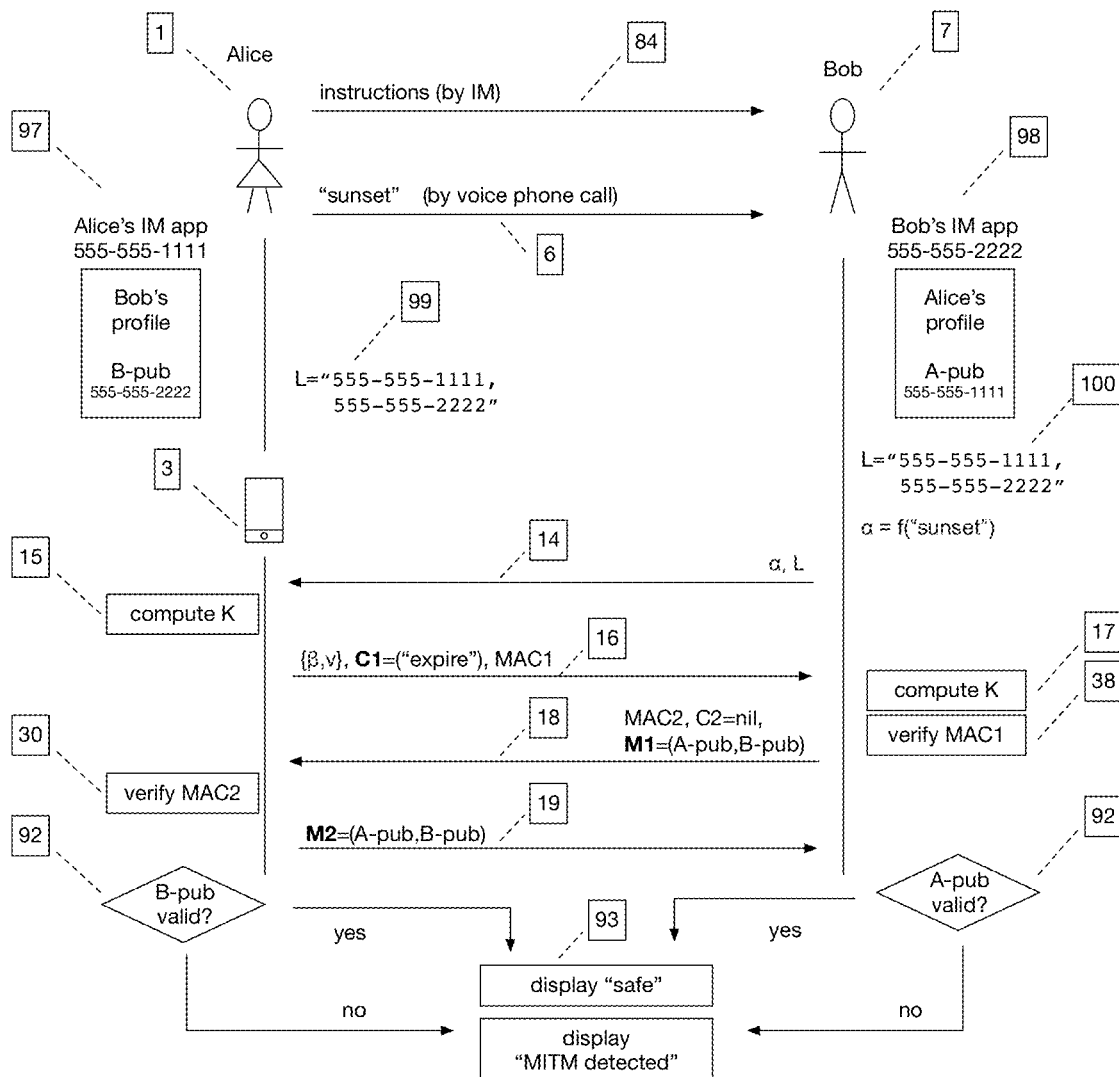
FIG. 16 presents an example scenario in which Alice can verify that she is communicating with Bob.

In a hypothetical scenario #5 shown in FIG. 16, Alice and Bob are chat-ting using an end-to-end encrypted Instant Messenger (IM) app in which they are registered with phone numbers 555-555-1111 and 555-555-2222 respectively. Alice inspects the contact details of Bob in her IM application [97], to see that his public identity key fingerprint is $B_{pub}$. Because the security of the end-to-end encryption of the IM protocol rests on this key to be the correct key of Bob, she would like to verify it with Bob. Alice uses the invention to accomplish the task. She configures her AppExample application by setting M to ($A_{pub}$, $B_{pub}$). She sets P as in scenario #1 to "once-only". She sets L to a concatenation of both phone numbers (her number first, then Bob's) [99]. She sets x to the password "sunset". She uses the IM communication channel to advise Bob to install a Verification-App-Example application. Then, she calls Bob on telephone and tells him that the password is "sunset." Bob follows the advice and installs the application either on his desktop or onto his own mobile device. The Verification-App-Example application asks him to enter his and Alice's phone numbers, then the ($A_{pub}$, $B_{pub}$) values as they appear in his IM application, and then the password "sunset" that he learned from Alice. Then, his application constructs L from the provided values [100] (Alice's number first, then his), and engages in the invented protocol with Alice's device. As before, $C_1$ and $C_2$ are set to "expire" and to null respectively. The values $M_1$ and $M_2$ in the protocol are both set to ($A_{pub}$, $B_{pub}$) [19] [18]. When the exchange ends, Bob is displayed "safe" if $M_1$ and $M_2$ are the same, and "Man-in-the-Middle (MITM) detected" if they are different [93]. Likewise, Alice also compares $M_1$ and $M_2$ to check if they are the same. If they are the same, that means that the public identity keys are correct and that that there is no MITM attack on their IM communication.

Figure 17:
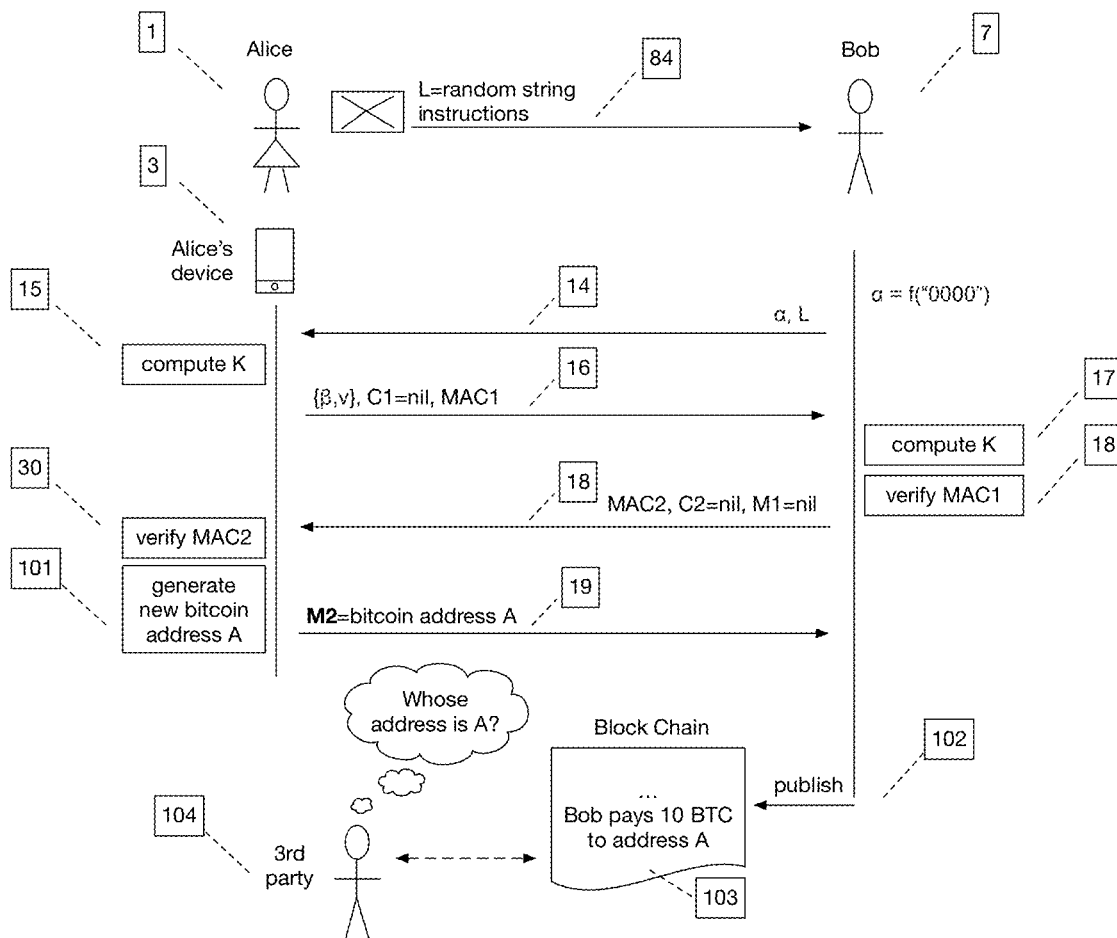
FIG. 17 presents an example scenario in which Alice sends to Bob her cryptocurrency address and then receives a cryptocurrency payment from Bob, but remains anonymous to any third party.

In a hypothetical scenario #6 shown in FIG. 17, Alice wants to receive a large Bitcoin payment from Bob, but does not wish a third party to know that she has received it. She generates a new Bitcoin payment address [101], and sends it to Bob using the invention as follows. She sets lookup identifier L to a random string and sends it Bob using an insecure channel. She uses a publicly known constant "0000" as the password. Bob uses the invention to receive the payment address in $M_1$ and makes the Bitcoin payment [102]. The record of payment [103] is added to the Bitcoin's public Blockchain, but a third party [104] cannot deduce from it that the receiving address belongs to Alice, because that association is nowhere recorded. (In contrast, if the payment address would have been sent to Bob by email, then a third party that has access to the email could learn that the address belongs to Alice.) After the first retrieval, the invention is configured to disallow all further retrieval attempts. When Alice receives the payment, she concludes that it is Bob who retrieved the payment address, since no impostor would pay her the same amount. Otherwise, if she observes that the data was retrieved, yet she didn't receive the payment within an expected period, she suspects that the address was retrieved by an imposter. In this case, she repeats the process: she generates a new payment address and sends it to Bob using the invention, using a new random lookup identifier.

The invention claimed is:

1. A method to securely transmit a first password over a network by transmitting a second password out-of-band, the method comprising:

a first operator registering a first device on a primary network;

recording to a first memory of the first device (i) a first password for sharing; and (ii) a second password or a value derived from the second password, wherein the first password and the second password or the value derived from the second password are recorded under a first identifier;

first operator communicating the second password to a second operator in one of a face-to-face meeting, a voice conversation, or over a secondary out-of-band network;

establishing a first communication channel between the first device and a second device over the primary network, wherein the second device is pre-programmed with the second password and the first identifier;

performing a data exchange between the first device and the second device over the established first communication channel, wherein the data exchange comprises:

transmitting, from the second device to the first device, an authentication request comprising the first identifier and a first set of parameters of a pre-determined Password Authenticated Key Exchange (PAKE) protocol, wherein the first set of parameters of the pre-determined PAKE protocol are derived from the first password;

computing, on the first device, a first symmetric cryptographic key based on the first password or the value derived from the first password and the first set of parameters of the pre-determined PAKE protocol received from the second device;

transmitting, from the first device to the second device, a second set of parameters of the pre-determined PAKE protocol, a first message authentication code (MAC) derived from the computed first symmetric cryptographic key, first and second sets of parameters of the pre-determined PAKE protocol, and a first command, wherein the first command is encrypted with the computed first symmetric cryptographic key to provide a first encrypted command;

computing, on the second device, the first symmetric cryptographic key based on the first set of parameters of the pre-determined PAKE protocol and the received second set of parameters of the pre-determined PAKE protocol;

deriving, on the second device, a first candidate MAC based on the first and second parameters of the pre-determined PAKE protocol, the first encrypted command, and the computed first symmetric cryptographic key;

validating, on the second device, that the derived first candidate MAC and the received first MAC match;

wherein if the first candidate MAC and the first MAC match, the second device (i) processes the received first encrypted command and generates a second command, wherein the second command is encrypted with the computed first symmetric cryptographic key to provide a second encrypted command, and (ii) transmits to the first device the second encrypted command, second encrypted data to be shared, and a second MAC derived from (a) the computed first symmetric cryptographic key, (b) the first and second sets of parameters of the pre-determined PAKE protocol; (c) the first and second encrypted commands; and (d) the second encrypted data to be shared; and deriving, on the first device, a second candidate MAC based on (a) the computed first symmetric cryptographic key, (b) the first and second sets of parameters of the pre-determined PAKE protocol; (c) the first and second encrypted commands; and (d) the second encrypted data to be shared;

validating, on the first device, that the second candidate MAC and the received second MAC match;

wherein if the derived second candidate MAC and the received second MAC match, the first device (i) decrypts and processes the received second encrypted command and decrypts and stores the received second encrypted data; and (ii) transmits the first encrypted data to be shared to the second device; and deciphering, on the second device, the received strong password using the computed first symmetric cryptographic key.

2. The method of claim 1, wherein the first and second devices are both personal devices.

3. The method of claim 2, wherein the second device is a public computer.

4. The method of claim 1, wherein the first and second devices are independently smart phones or personal computers.

5. The method of claim 1, wherein a pre-determined number of authentication attempts may be performed, and wherein if the pre-determined number of authentication attempts is exceeded one of the first or second devices rejects any further authentication attempts during a pre-determined rejection time period.

6. The method of claim 1, wherein the data exchange occurs during a pre-determined time period.

7. The method of claim 1, wherein the PAKE protocol is selected from the group consisting of an OPRF protocol, a DH-OPRF protocol, and a Secure Remote Password (SRP) protocol.

8. The method of claim 1, wherein the established first communication channel is a direct peer-to-peer communication channel.

9. The method of claim 1, wherein the established first communication channel is facilitated through a signaling server.

10. The method of claim 9, wherein the signaling server transmits a Push Notification to the first device, and wherein the transmitted Push Notification includes the first set of parameters of the pre-determined PAKE protocol and the first identifier.

11. The method of claim 1, wherein the second password is a password of low entropy.

12. The method of claim 1, wherein after the data exchange is performed, the second password cannot be reused.

13. The method of claim 1, wherein the secondary out-of-band network is a telecom cellular network; and the second password is communicated by Short Message Service (SMS).

14. The method of claim 1, wherein the second password is communicated using an Instant Messenger.

15. The method of claim 1, wherein the second password is a set of objects denoted by words or by pictures.

16. A method of encrypted electronic mail (email) messaging, the method comprising:

a first operator configuring a first device, the configuration comprising:
(i) choosing a first symmetric cryptographic key;
(ii) creating a ciphertext by encrypting information using the first symmetric cryptographic key;
(iii) composing an email message, where the email message comprises (a) a body comprising the created ciphertext and additional information; (b) a header including an email address of one or more recipients, where the one or more recipients includes at least a second operator; and a subject header including (i) encrypted subject information, and (ii) additional subject information;
(iv) deriving a first identifier based on the composed email message;
(v) recording to a first memory of a first device (i) the first symmetric cryptographic key; and (ii) a first password or a value derived from the first password, wherein the first symmetric cryptographic key and the first password or the value derived therefrom are recorded under the first identifier;

registering the first device on a network;

transmitting the composed email message to the one or more recipients;

receiving the composed email message on at least a second device and identifying that it includes ciphertext;

deriving, on the second device, the first identifier from the received composed email message;

establishing a first communication channel between the first device and the second device, wherein the second device is pre-programmed with the first password and the first identifier;

performing a data exchange between the first device and the second device over the established first communication channel, wherein the data exchange comprises:
transmitting, from the second device to the first device, an authentication request comprising the first identifier and a first set of parameters of a pre-determined Password Authenticated Key Exchange (PAKE) protocol, wherein the first set of parameters of the pre-determined PAKE protocol are derived from the first password;
computing, on the first device, a second symmetric cryptographic key based on the first password or the value derived from the first password and the first set of parameters of the pre-determined PAKE protocol received from the second device;
transmitting, from the first device to the second device, a second set of parameters of the pre-determined PAKE protocol, a first message authentication code (MAC) derived from the computed first symmetric cryptographic key, first and second sets of parameters of the pre-determined PAKE protocol, and a first command, wherein the first command is encrypted with the computed second symmetric cryptographic key to provide a first encrypted command;

computing, on the second device, the second symmetric cryptographic key based on the first set of parameters of the pre-determined PAKE protocol and the received second set of parameters of the pre-determined PAKE protocol;

deriving, on the second device, a first candidate MAC based on at least the first and second parameters of the pre-determined PAKE protocol, the first encrypted command, and the computed second symmetric cryptographic key;

validating, on the second device, that the derived first candidate MAC and the received first MAC match;

wherein if the first candidate MAC and the first MAC match, the second device (i) decrypts and processes the received first encrypted command and generates a second command, wherein the second command is encrypted with the computed second symmetric cryptographic key to provide a second encrypted command, and (ii) transmits to the first device the generated second encrypted command and a second MAC derived from (a) the computed second symmetric cryptographic key, (b) the first and second sets of parameters of the pre-determined PAKE protocol; (c) the first and second encrypted commands; and deriving, on the first device, a second candidate MAC based on (a) the computed second symmetric cryptographic key, (b) the first and second sets of parameters of the pre-determined PAKE protocol; (c) the first and second encrypted commands;

validating, on the first device, that the second candidate MAC and the received second MAC match;

wherein if the derived second candidate MAC and the received second MAC match, the first device (i) decrypts and processes the received second encrypted command; and (ii) transmits to the second device the first symmetric cryptographic key encrypted with the second symmetric key; and the second device decrypts the first symmetric encryption key using the computed second symmetric key;

deciphering the ciphertext included in the email message using the received first symmetric cryptographic key;

wherein a pre-determined number of authentication attempts may be performed, and wherein if the pre-determined number of authentication attempts is exceeded one of the first or second devices rejects any further authentication attempts during a pre-determined rejection time period.

17. The method of claim 16, wherein the first and second devices are both personal devices.

18. The method of claim 17, wherein the password is communicated by one of Short Message Service (SMS) or Instant Messenger.

19. The method of claim 16, wherein the second device is a public computer.

20. The method of claim 16, wherein a pre-determined number of authentication attempts may be performed, and wherein if the pre-determined number of authentication attempts is exceeded one of the first or second devices rejects any further authentication attempts; or wherein a pre-determined number of authentication attempts may be performed, and wherein if the pre-determined number of authentication attempts is exceeded one of the first or second devices rejects any further authentication attempts during a pre-determined rejection time period.

21. The method of claim 16, wherein the data exchange occurs during a pre-determined time period.

22. The method of claim 16, wherein the PAKE protocol is selected from the group consisting of an OPRF protocol, an DH-OPRF protocol, and a Secure Remote Password (SRP) protocol.

23. The method of claim 16, wherein the established first communication channel is a direct peer-to-peer communication channel.

24. The method of claim 16, wherein the established first communication channel is facilitated through a signaling server.

25. The method of claim 24, wherein the signaling server transmits a Push Notification to the first device, and wherein the transmitted Push Notification includes the first set of parameters of the pre-determined PAKE protocol and the first identifier.

26. The method of claim 16, wherein the first and second commands facilitate a negotiation of a second password.

27. The method of claim 26, wherein the second password is used for subsequent secured communications between the first and second devices.

28. The method of claim 16, wherein the first and second commands establish an OTP scheme used for subsequent secured communications between the first and second devices.

29. The method of claim 16, wherein the first password is a publicly known password.

30. The method of claim 16, wherein the first password is a password having low entropy.

31. The method of claim 16, wherein after the data exchange is performed, the first password cannot be reused.

32. The method of claim 16, wherein the first device is pre-programmed with first operator's asymmetric public key, the first command includes first operator's asymmetric public key and the second device stores it in a contact card of the first operator; and, subsequent emails from a second operator to the first operator are encrypted asymmetrically using the asymmetric public key of the first operator.

33. The method of 16, wherein the second device is pre-programmed with second operator's asymmetric public key, the second command includes a second operator's asymmetric public key and the first device stores it in a contact card of the second operator; and, subsequent emails from the first operator to the second operator are encrypted asymmetrically using the asymmetric public key of the second operator.

34. The method of claim 16, wherein the header of the composed email message comprises a plurality of email addresses corresponding to the one or more recipients, wherein:

a N-th recipient is a (N+1)-th operator using a (N+1)-th device;

a N-th identifier is derived such that it identifies the N-th recipient;

the first device uses a bank of memory to record under N-th identifier the data pertaining to the N-th recipient;

wherein when the first device communicates with one or more third devices, it uses the identifier received from the one or more third devices to lookup the data stored in the bank of memory.

35. The method of claim 34, wherein the first device records a different password for each recipient of the one or more recipients, and each recipient of the one or more recipients must use the corresponding password to receive the symmetric cryptographic key.

36. The method of claim 16, wherein the first password is an ordered list of objects denoted by words or by pictures.

37. The method of claim 32, where the asymmetric key of first person is represented using a PGP public key or an S/MIME certificate, or another Public Key Infrastructure (PKI) certificate.

38. The method of claim 33, where the asymmetric key of the second operator is represented using a PGP public key, or an S/MIME certificate, or another Public Key Infrastructure (PKI) certificate.

* * * * *